Oct. 3, 1961 C. Z. MONROE ET AL 3,002,328
PACKAGING MACHINE FOR ERECTING, FILLING AND SEALING PLASTIC
COATED PAPERBOARD CONTAINERS
Filed Dec. 9, 1958 15 Sheets-Sheet 1
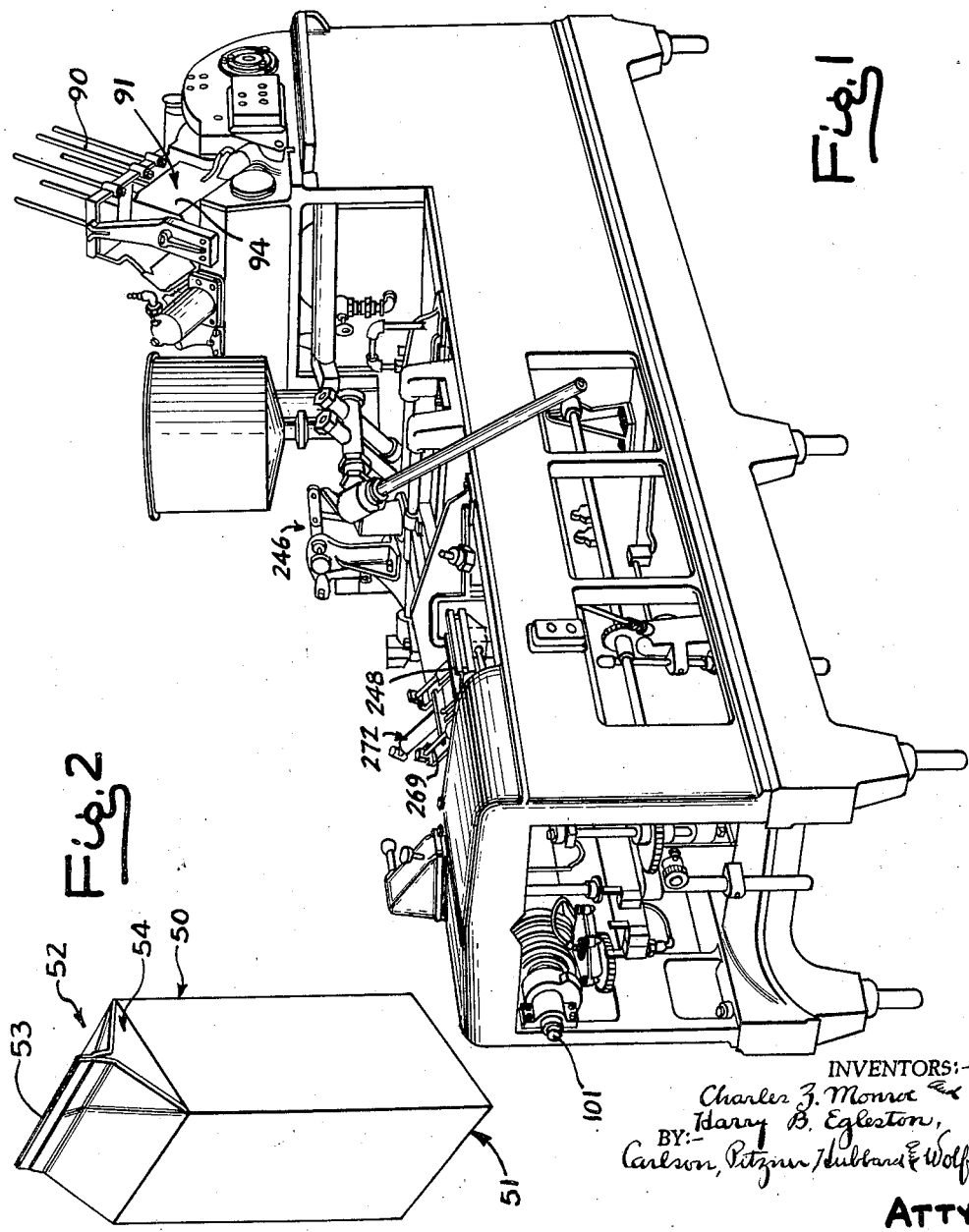
INVENTORS:-
Charles Z. Monroe
Harry B. Egleston
BY:- Carlson, Pitzner, Hubbard & Wolfe,
ATTYS.

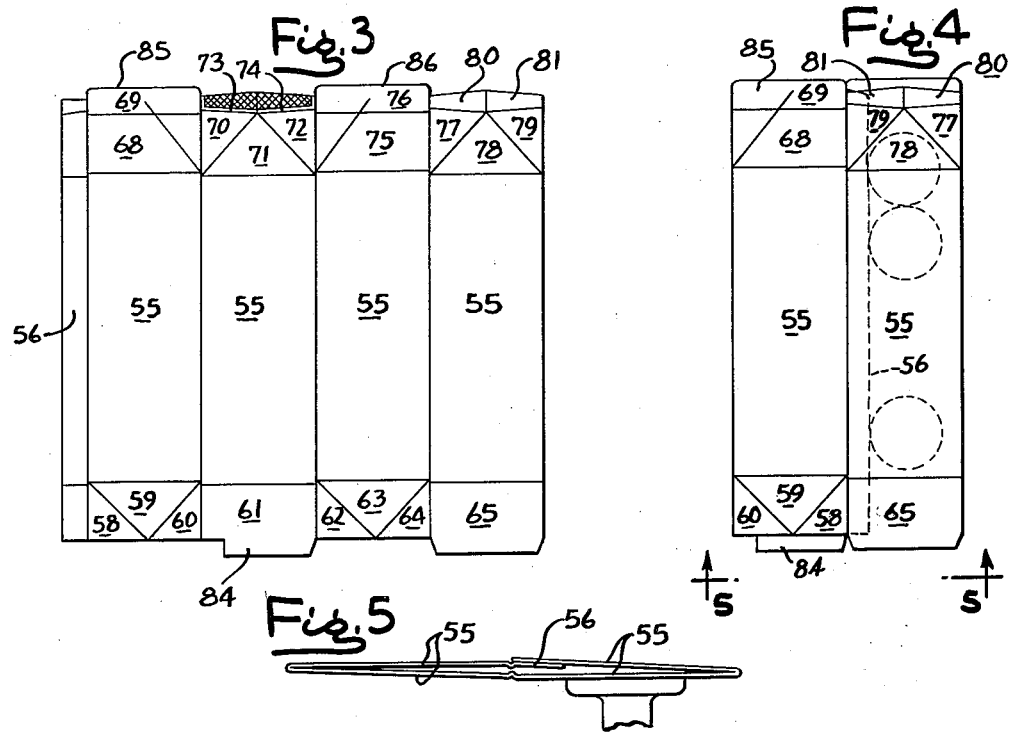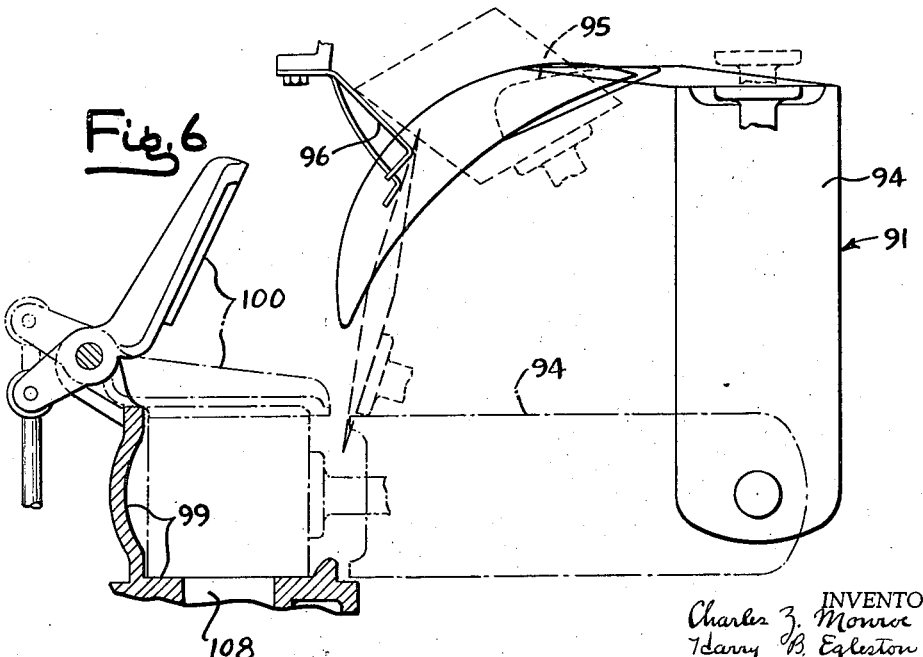

Oct. 3, 1961 C. Z. MONROE ET AL 3,002,328
PACKAGING MACHINE FOR ERECTING, FILLING AND SEALING PLASTIC
COATED PAPERBOARD CONTAINERS
Filed Dec. 9, 1958 15 Sheets-Sheet 3
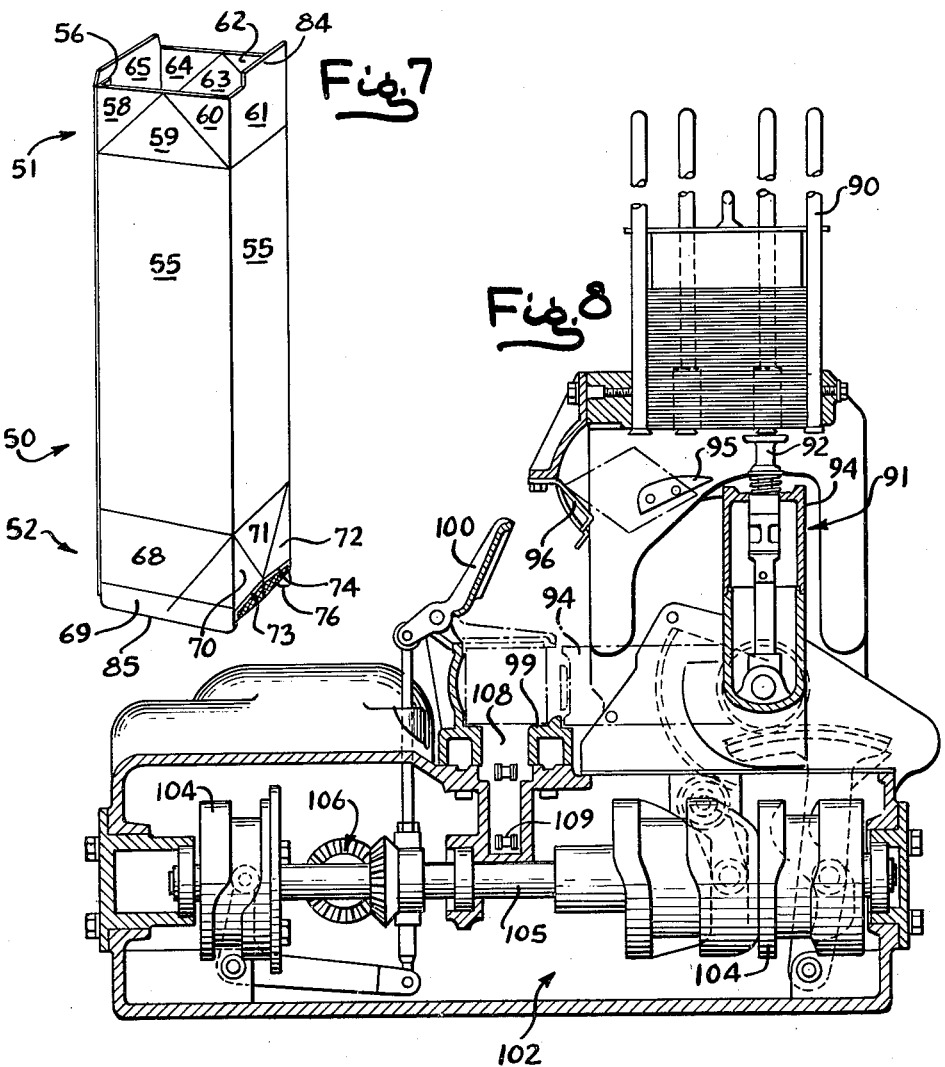
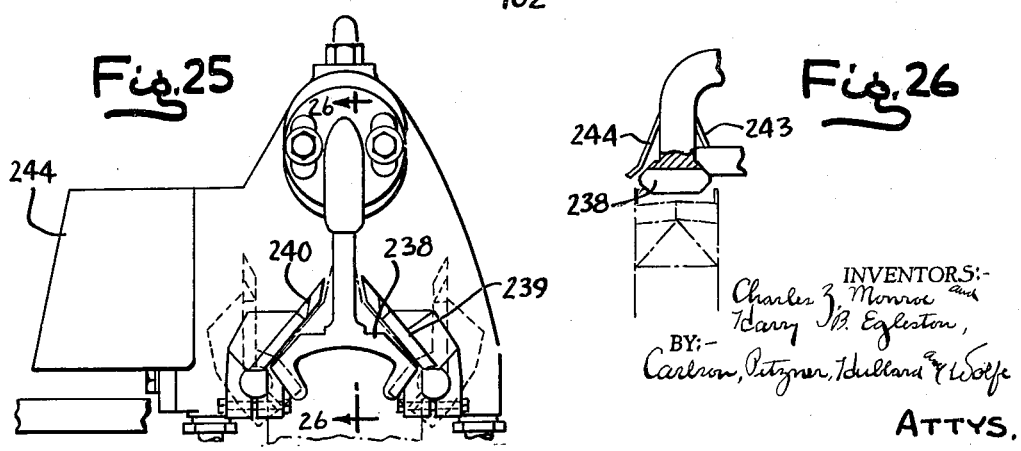
INVENTORS:-
Charles Z. Monroe and
Harry B. Egleston,
BY:-
Carlson, Pitzner, Hubbard & Wolfe
ATTYS.

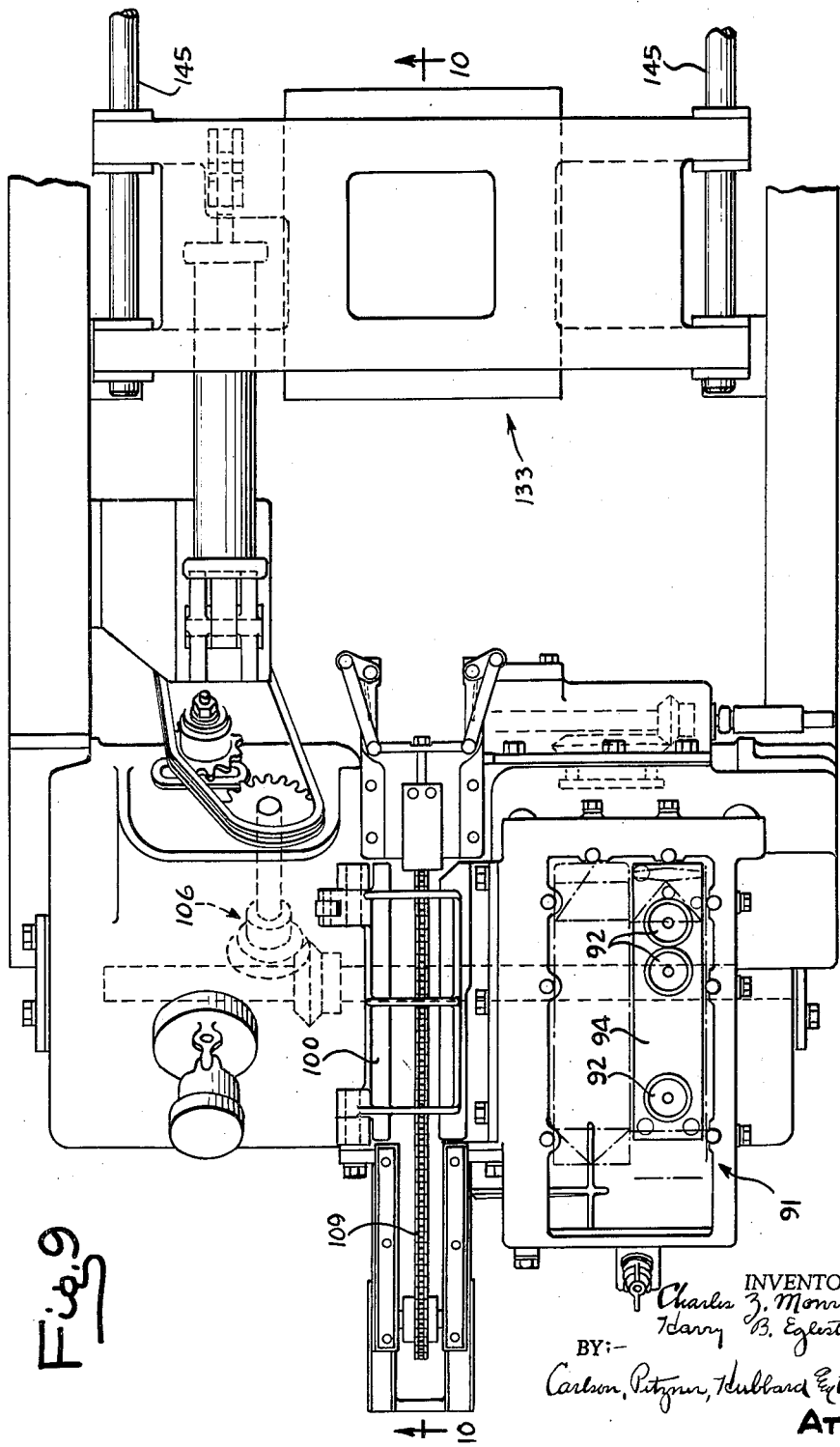

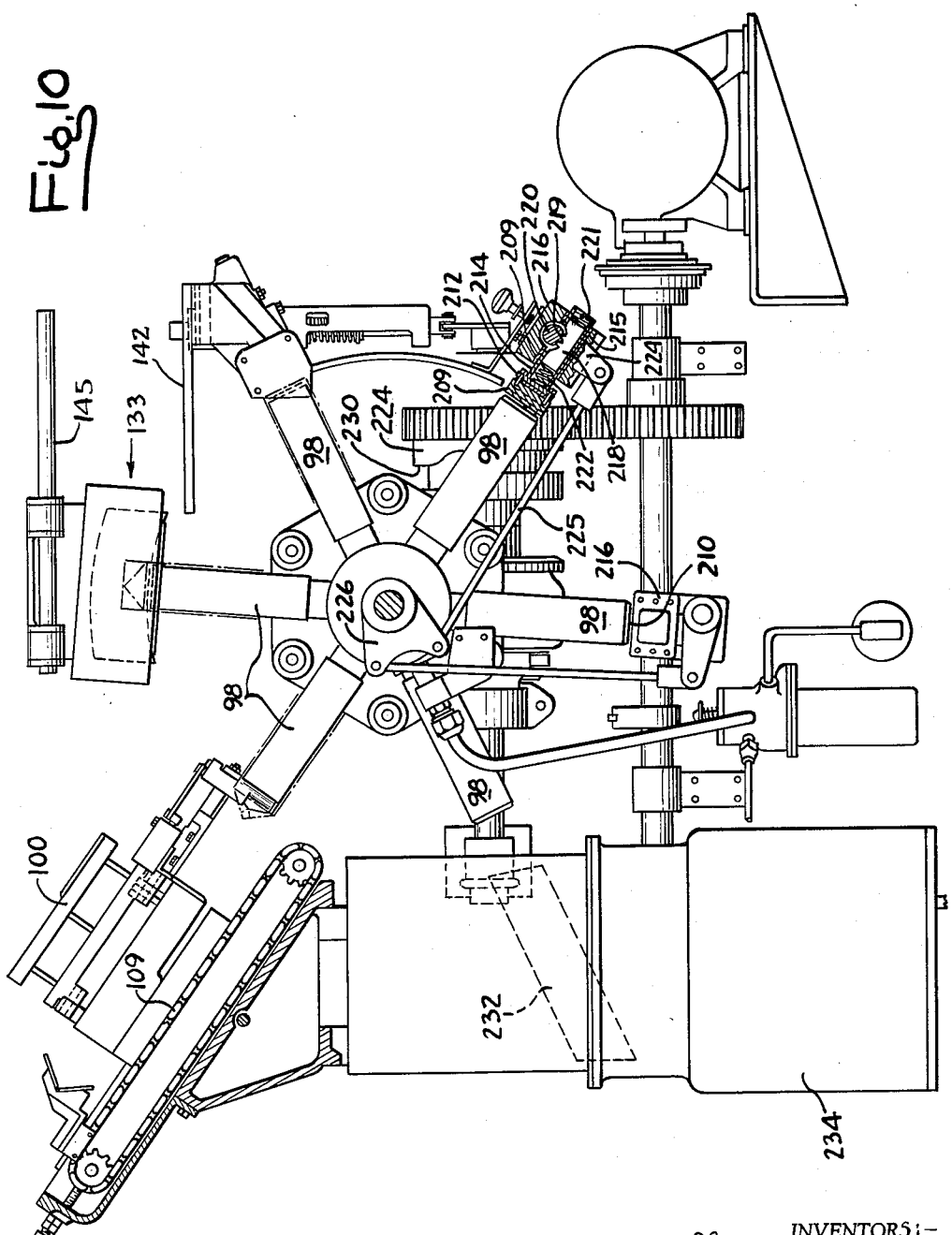

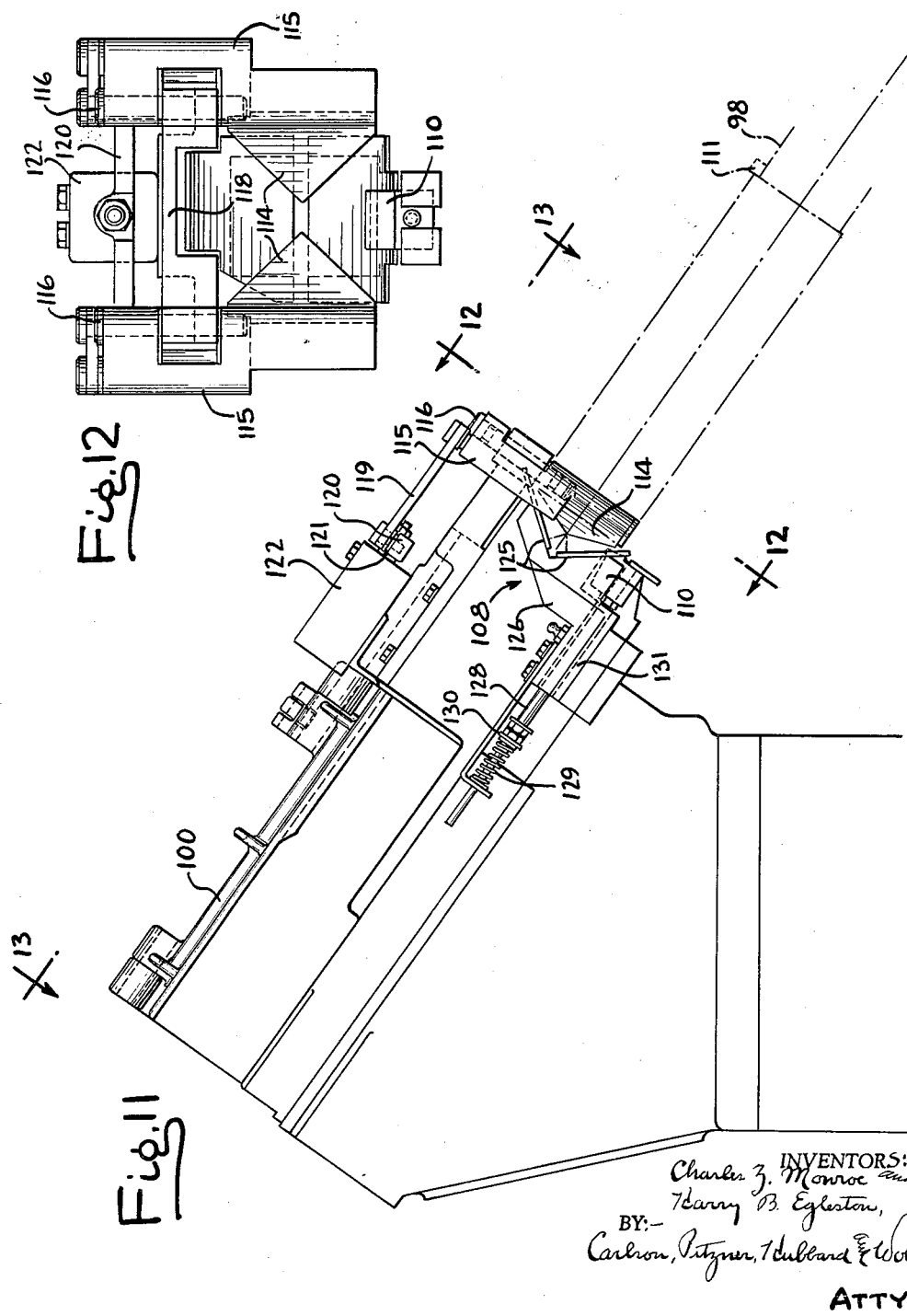

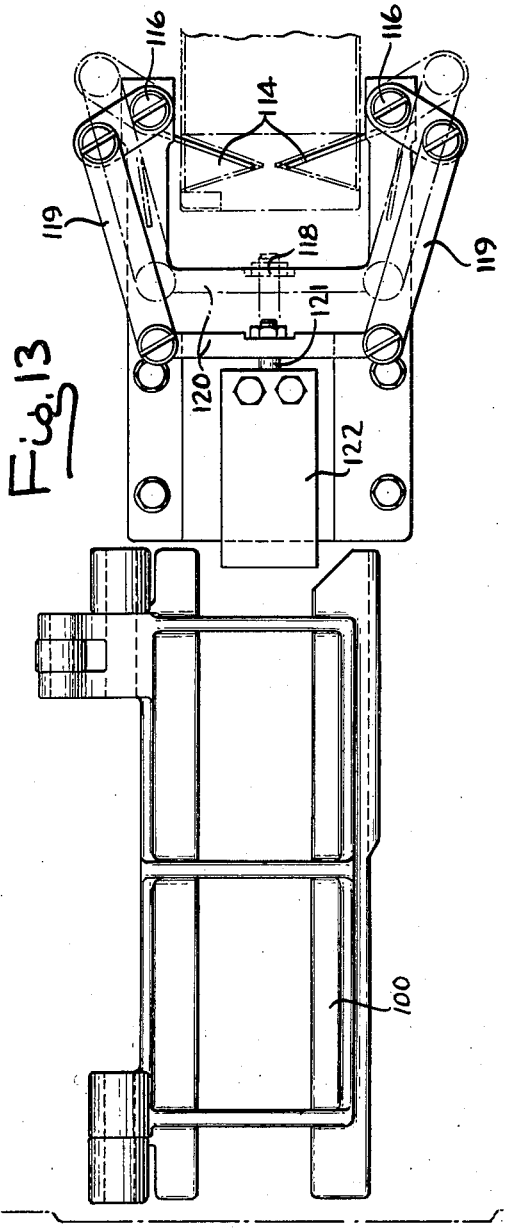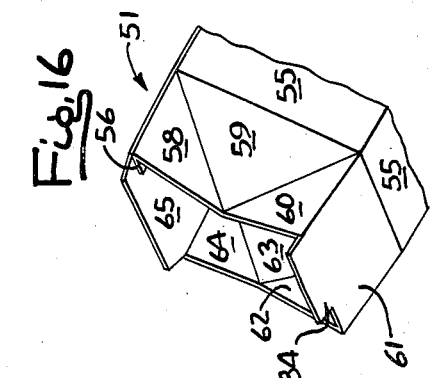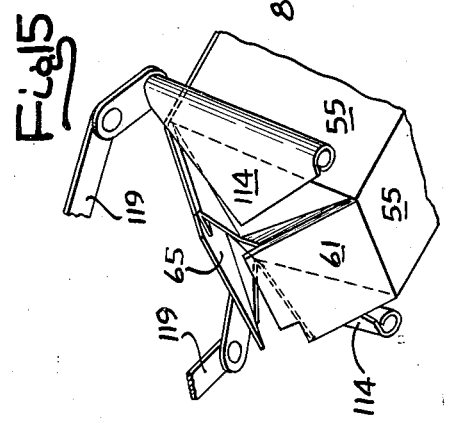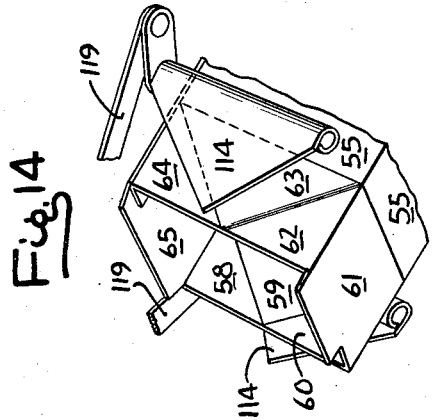

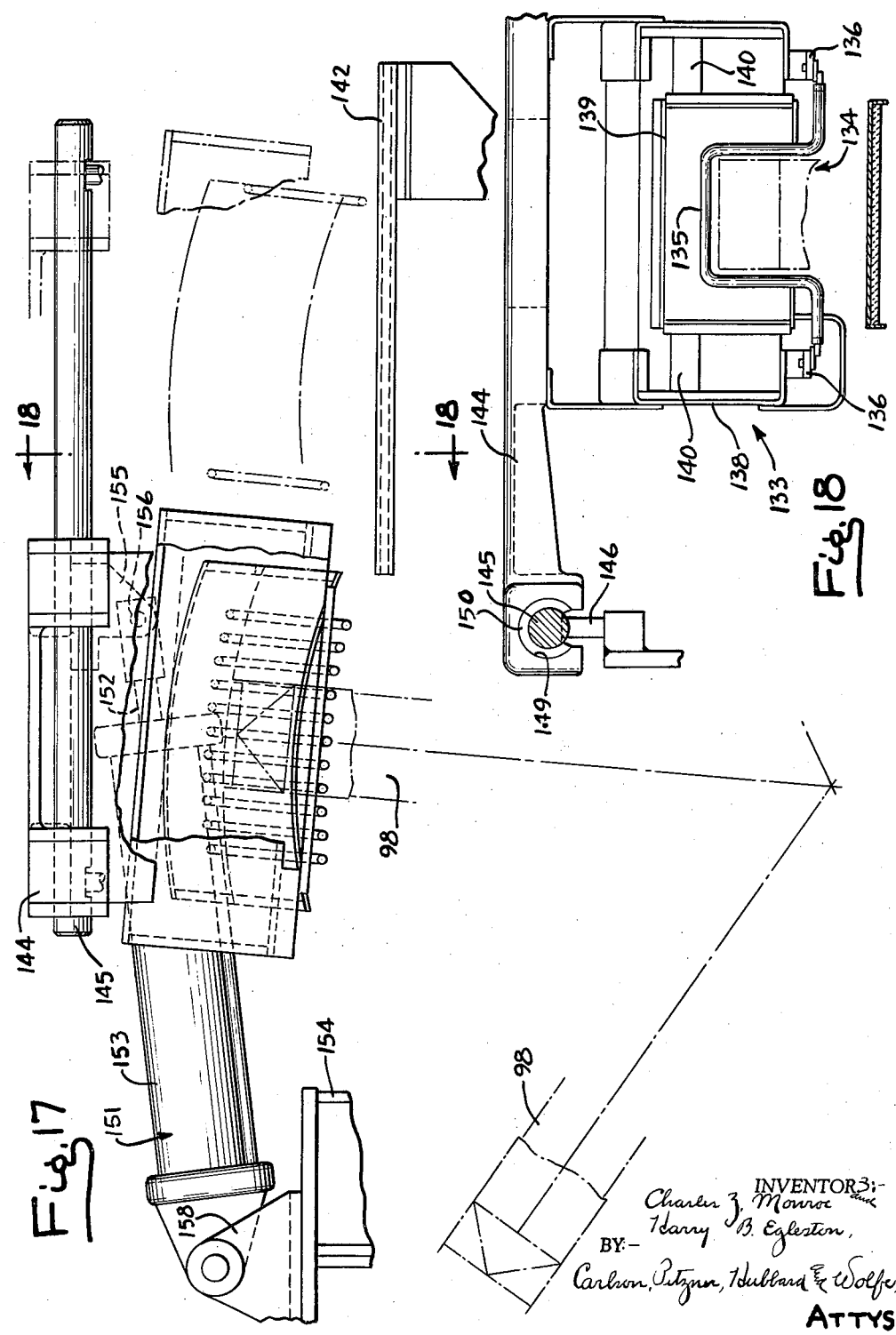

Oct. 3, 1961 C. Z. MONROE ET AL 3,002,328
PACKAGING MACHINE FOR ERECTING, FILLING AND SEALING PLASTIC
COATED PAPERBOARD CONTAINERS
Filed Dec. 9, 1958 15 Sheets-Sheet 9
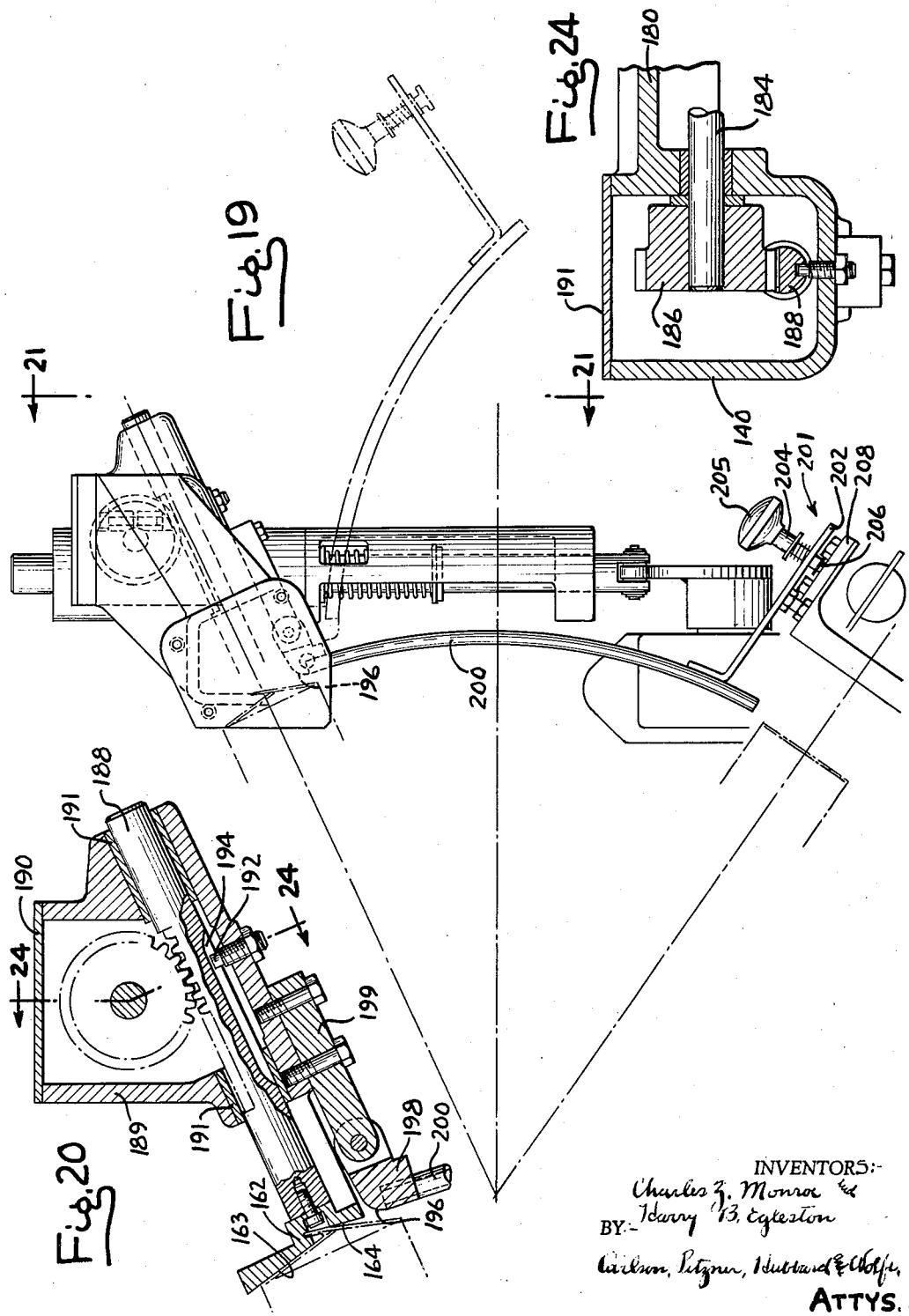
INVENTORS:-
Charles Z. Monroe
Harry B. Egleston
BY:-
Carlson, Pitzner, Hubbard & Wolfe,
ATTYS.

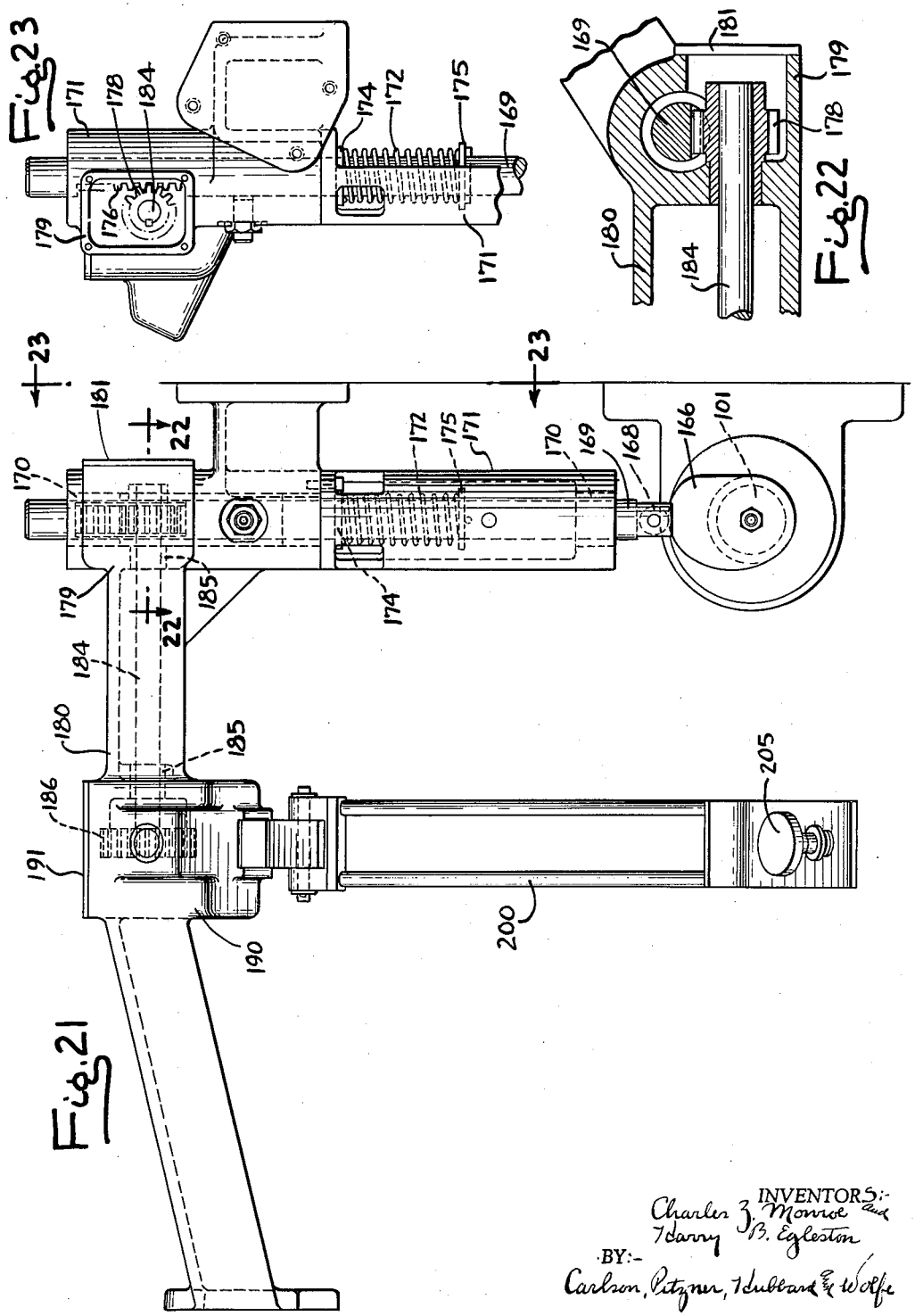

Oct. 3, 1961 C. Z. MONROE ET AL 3,002,328
PACKAGING MACHINE FOR ERECTING, FILLING AND SEALING PLASTIC
COATED PAPERBOARD CONTAINERS
Filed Dec. 9, 1958 15 Sheets-Sheet 11
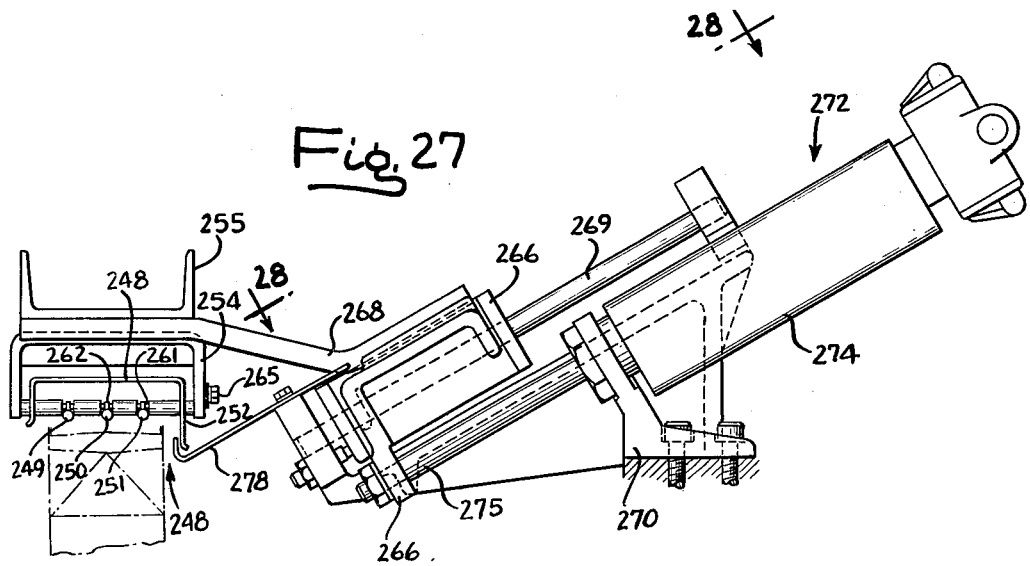
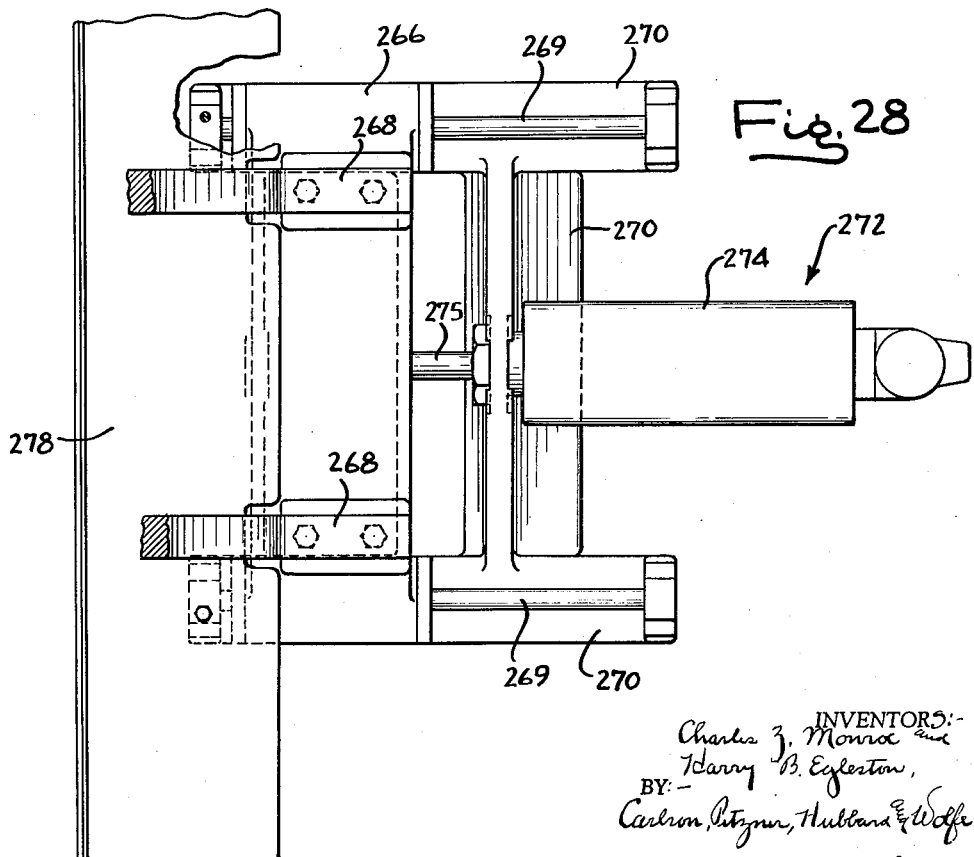
INVENTORS:-
Charles Z. Monroe and
Harry B. Eggleston,
BY:-
Carlson, Pitzner, Hubbard & Wolfe
ATTYS.

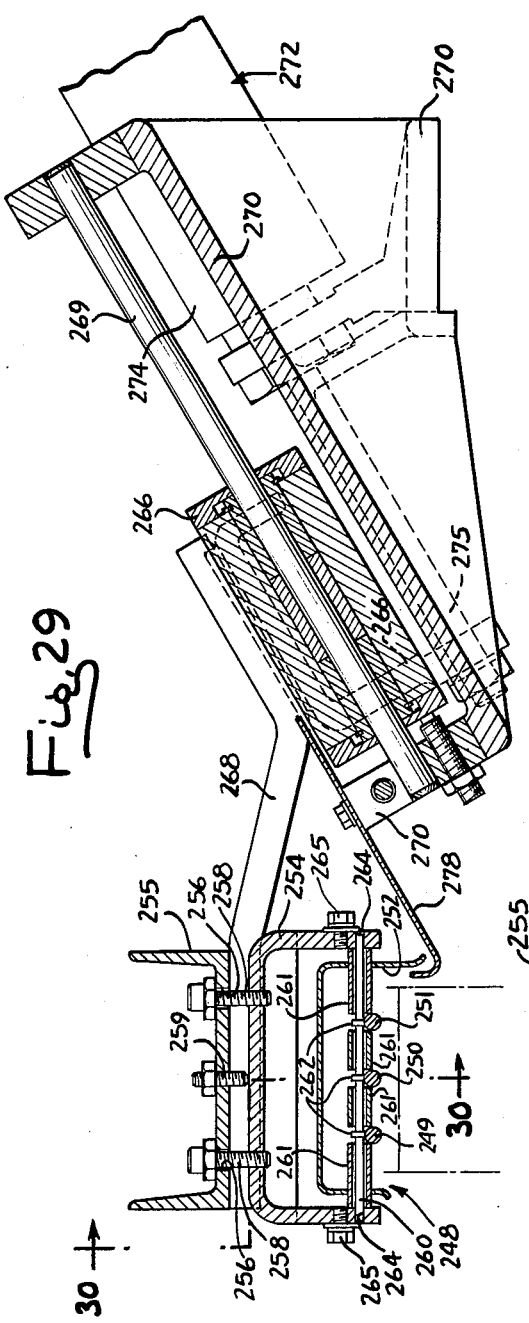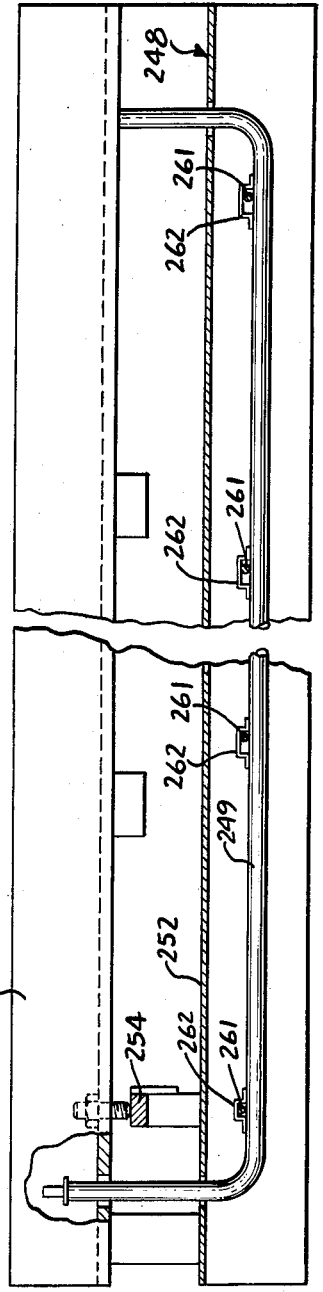

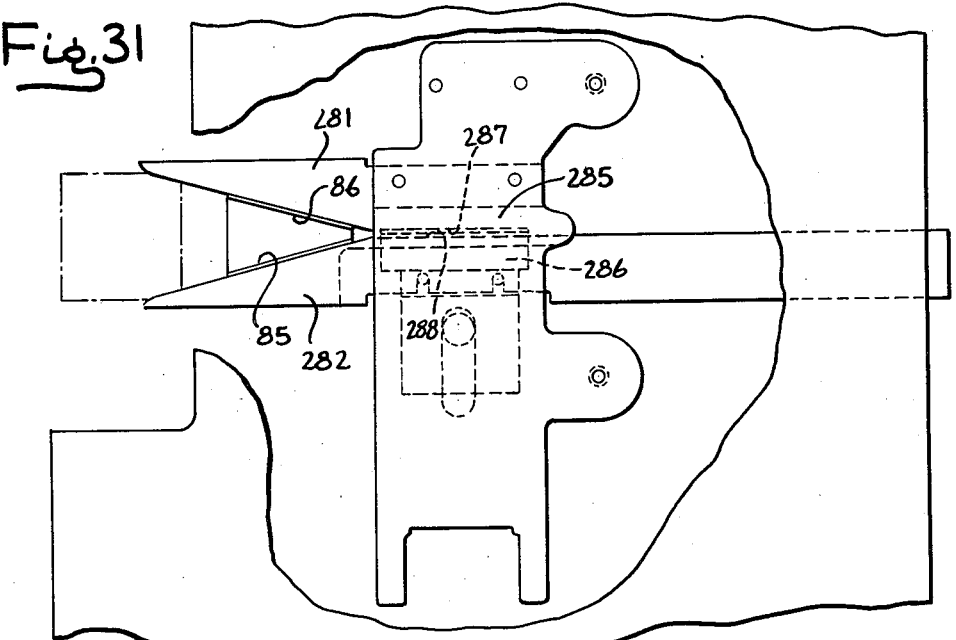
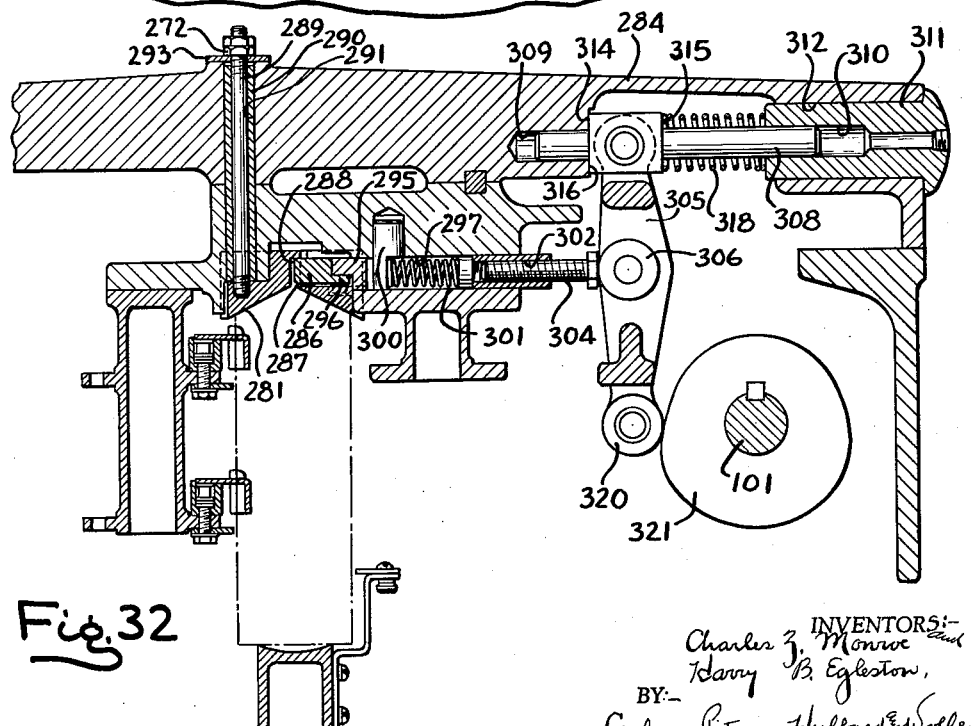

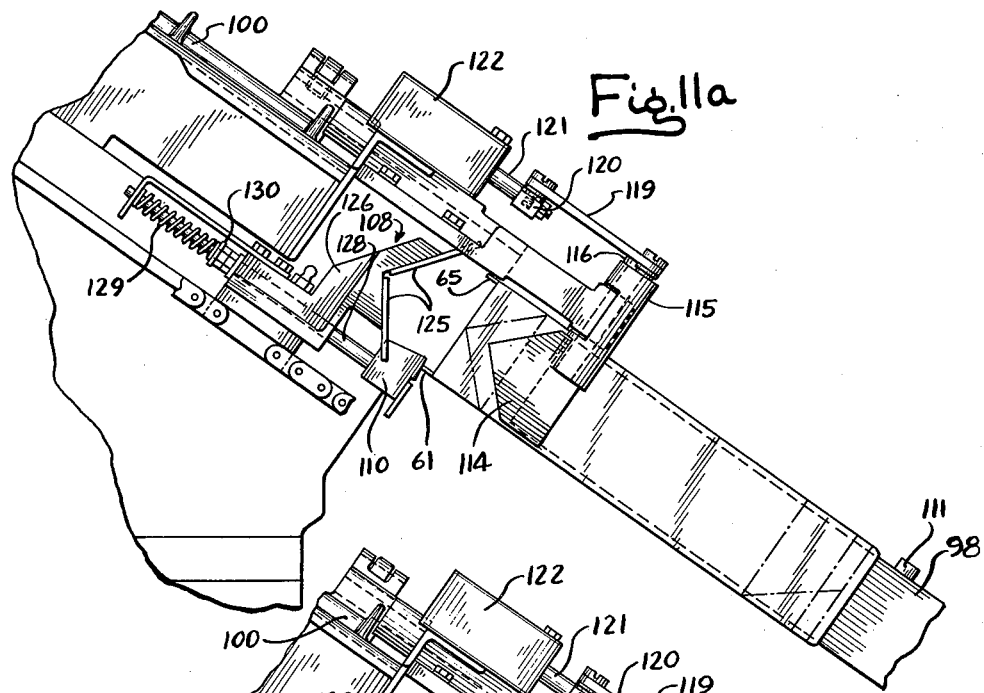

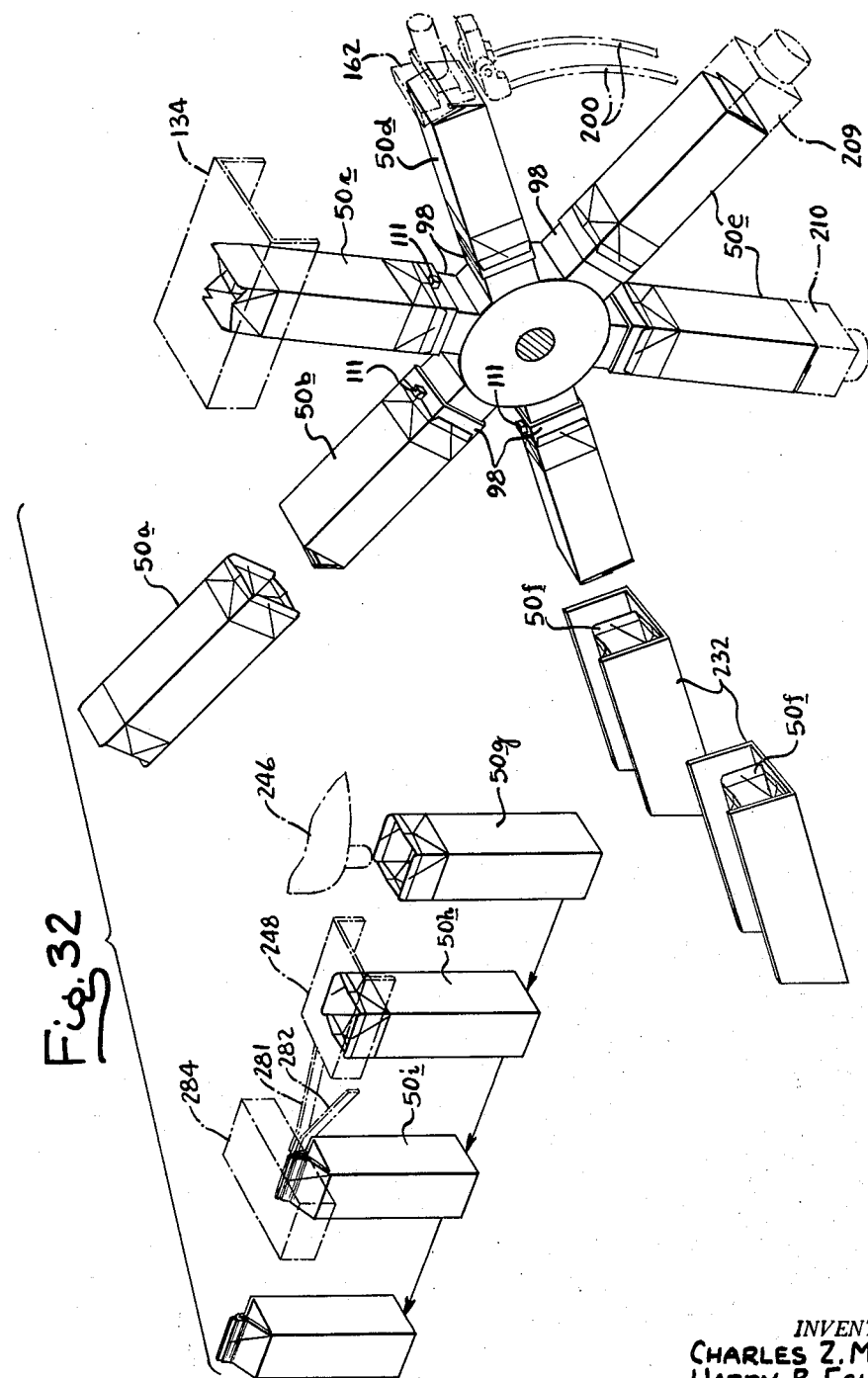

3,002,328
PACKAGING MACHINE FOR ERECTING, FILLING AND SEALING PLASTIC COATED PAPERBOARD CONTAINERS
Charles Z. Monroe, Detroit, and Harry B. Egleston, Livonia, Mich., assignors to Ex-Cell-O Corporation, Detroit, Mich., a corporation of Michigan
Filed Dec. 9, 1958, Ser. No. 779,229
5 Claims. (Cl. 53—373)

The present invention relates to packaging machines and more particularly to an improved packaging machine for receiving cut and scored blanks of paperboard having a coating of thermoplastic material thereon and erecting a container from such a blank, filling the container and then sealing the filled container.

Automatic packaging machines for forming, filling and sealing containers starting with a previously cut and scored paper blank are well known in the art and have received widespread commercial use in such establishments as dairies where they find their principal function in the packaging of milk and other dairy products.

One form of container which is presently in widespread commercial use is the gable topped pouring spout container of the type disclosed in U.S. Patent No. 2,750,095. Such a container is customarily erected from a flat blank formed of paperboard sheet stock which has been cut to shape and impressed with an appropriate pattern of score lines. These lines define a plurality of side panels with corresponding upper and lower extension flaps or closure members. The usual procedure in erecting such a container is first to form the blank into a polygonal tube open at both ends and then close the lower or bottom panel extensions retaining them in place by means of a suitable adhesive or glue. It is presently the practice to coat or impregnate the exposed surfaces of the erected tube with a protective medium by immersing it in a bath of molten paraffin wax. Following this operation, which serves to coat as well as to sterilize the surfaces of the container, the latter is cooled to harden the paraffin and is then filled with a selected product such as milk.

After the container has been filled, the top is closed by pressing the closure flap elements together with heated jaws which melt the paraffin so that it flows into any crevices formed between the top closure flaps. At the same time a staple is inserted through the top closure to hold the flaps tightly together. These paraffin coated containers are possessed of certain inherent disadvantages, however, among which are the requirement that a tank of molten paraffin must be maintained as a part of the packaging machine, and the fact that the paraffin coating may flake off of the container walls. While such flakes do not impair the sanitary integrity of the container contents, they do reduce to some extent, the acceptance of the package by the consumer.

It has now been discovered that paperboard of the quality used for dairy product containers can be economically coated with heat and pressure sensitive thermoplastic substances. A thermoplastic substance to be used on containers in which dairy products are to be packaged is desirably one which is inert to the substance to be packaged, is strong and durable, is inexpensive and is easy to apply in sheet form onto the paperboard, either by a laminating process or by an extruding process. A thermoplastic coating of this sort must render the paper sheet material resistant to fluids which would be packed in a container including such acidic products as milk. One example of one thermoplastic substance which has been found useful for packaging dairy products is the polymer polyethylene. The paper stock to be used for forming the containers can be economically coated on both sides with a thin layer of polyethylene which is effective in imparting the foregoing properties to the paper. A container blank can be formed from the coated paperboard stock in the usual manner by stamping and scoring the blanks, folding them over and, by means of a suitable side seam, providing a flattened tube which may be erected into a container in an automatic machine.

Containers produced from the thermoplastic polyethylene coated paperboard sheet material are strong, simple to erect, close and seal. The polyethylene not only protects the contents of the container against the admission of harmful substances but also serves as a sealing medium for closing and tightly sealing the container. The polyethylene coated closure flaps afford a strong and leakproof closure which remains fluidtight even under the severe handling often received by the containers.

One illustrative container of the type formed from paperboard having a polyethylene coating thereon is described and claimed in copending application Serial No. 707,259, filed January 6, 1958. For a more detailed description of such a container, reference should be made to this application.

As pointed out in the above-mentioned copending application, the polyethylene coating on the paperboard containers serves as a heat and pressure sensitive adhesive for the purpose of sealing the closure members of the container. When polyethylene is employed as the thermoplastic coating, suitable precautions must be taken to avoid destroying this coating as the containers are erected and sealed. The primary reason for this is the low melting point of polyethylene and its tendency to stick to heated surfaces.

It is the principal object of the present invention to provide a machine capable of receiving container blanks having an overall coating of polyethylene, or other like thermoplastic material, and forming such blanks into a container having tightly sealed closure members by employing the polyethylene coating as an adhesive.

Another object of the present invention is to provide a mechanism for fusing and sealing the polyethylene coated closure flaps of a container without destroying the integrity of the polyethylene coating. More specifically, it is an object of the present invention to provide a machine of the foregoing character which operates automatically and rapidly to heat the polyethylene coating on the surface of the container closures, and then fold and seal said closures together. A further object of the present invention is to provide a machine of the above type wherein the heat sealing mechanism is instantly ready for operation and yet which, when in stand-by position, is isolated from the machine so that the parts thereof which contact the coated polyethylene containers remain at a sufficiently low temperature to avoid sticking to the melted coating of the containers.

Another object of the present invention is to provide a machine of the foregoing character for sealing the closure flaps of paperboard containers having an overall coating of a thermoplastic material which heats the closure members to a sufficiently high temperature at one station without damaging the paperboard so that the closure members may be pressed together to form a strong, fluidtight seal at a subsequent station.

Still another object of the present invention is to provide a machine of the foregoing type which operates automatically and efficiently to produce a sterile, filled container of the type described, which machine occupies a minimum of space, is light in weight when compared to machines of the type heretofore employed, is of simplified construction to facilitate the rapid closing and sealing of the containers, and is easy to maintain in a sterile condition in accordance with the high standards in the dairy industry.

A more detailed object of the invention is to provide a machine of the above character for erecting and closing the flaps of a paperboard container having a polyethylene coating thereon, which machine first heats the polyethylene coating to above its fusion point, then tucks the closure members together, and finally presses the tucked closure members having the fused polyethylene thereon with a sufficient force to effect a liquid-tight seal, so that the integrity of the film is preserved at all times. A further detailed object of the present invention is to provide a mechanism which is capable of fusing the polyethylene on the surfaces of the container closure members without actually coming into contact with said members.

Other objects and advantages of the present invention will become apparent as the following description proceeds, taken in connection with the accompanying drawings wherein:

FIGURE 1 is a perspective view of a container erecting, filling and closing machine embodying the present invention.

FIG. 2 is a perspective view of a sealed container of the type contemplated for use with the present invention.

FIG. 3 is a layout view of a blank showing the inside surface thereof for use in erecting a container of the type shown in FIG. 2.

FIG. 4 is a flattened tubular blank constructed from the blank shown in FIG. 3 by the formation of a side seam.

FIG. 5 is a plan view of a blank of the type shown in FIG. 4 engaged by a nozzle for withdrawing it from a magazine.

FIG. 6 is a schematic plan view of a nozzle mechanism for squaring and applying a reverse bend to the blank of the type shown in FIG. 4.

FIG. 7 is a perspective view of a squared out tubular blank.

FIG. 8 is a section view through an illustrative blank feeding and squaring mechanism.

FIG. 9 is a plan view of a mechanism for squaring and feeding a squared blank onto a mandrel for the substantial purpose of closing the bottom closure elements of the container.

FIG. 10 is a section view taken substantially in the plane of line 10—10 of FIG. 9 and illustrating the mandrel and bottom closure mechanisms in further detail.

FIG. 11 is an enlarged view of a mechanism for placing a squared tubular blank onto a mandrel and illustrating the mechanism in the position just subsequent to the positioning of a container on the mandrel.

FIGS. 11a–11d, inclusive, are views corresponding to FIG. 11 but showing the container in successive positions and illustrating the prebending of the container bottom closure flaps.

FIG. 12 is a section view taken substantially in the plane of line 12—12 of FIG. 11.

FIG. 13 is a view taken substantially in the plane of line 13—13 on FIG. 11.

FIGS. 14, 15 and 16 are perspective views illustrating a progressive prebending operation for the purpose of breaking the score lines defining the bottom closure flaps.

FIG. 17 is an elevation view illustrating a heating mechanism for heating the bottom closure flaps of the container to melt the thermoplastic coating thereon.

FIG. 18 is a view taken substantially in the plane of line 18—18 of FIG. 17 and illustrating the heating tunnel in further detail.

FIG. 19 illustrates a mechanism for closing the bottom closure of a container carried on a mandrel.

FIG. 20 is an enlarged detail view of the bottom closure fingers shown in FIG. 19.

FIG. 21 is a section view taken substantially in the plane of line 21—21 on FIG. 19 and illustrating in elevation the actuating mechanism for the bottom closing fingers.

FIG. 22 is a section view taken substantially in the plane of line 22—22 of FIG. 21.

FIG. 23 is a section view taken substantially in the plane of line 23—23 of FIG. 21.

FIG. 24 is a section view taken substantially in the plane of line 24—24 of FIG. 21.

FIG. 25 illustrates a mechanism for preclosing the top closure elements of the container.

FIG. 26 is an elevation view of a heating device for heating the top closure flaps prior to sealing.

FIG. 27 is a view taken substantially in the plane of line 27—27 of FIG. 26.

FIG. 28 is a vertical section view taken through the heating device shown in FIG. 26.

FIG. 29 is a section view taken substantially in the plane of line 29—29 on FIG. 28.

FIG. 30 is a plan view of a flap closing mechanism shown with a portion of the machine housing broken away.

FIG. 31 is a vertical section taken substantially in the plane of line 31—31 on FIG. 30 and illustrating a pressure mechanism for sealing the top closure of the containers.

FIG. 32 is a diagrammatic view illustrating successive steps in the erecting, filling and closing of a container in the mechanism embodying the invention.

While a certain illustrative packaging machine will be described, it should be understood that there is no intention to limit the invention to the specific form disclosed. On the contrary, the intention is to cover all modifications, alternative constructions, equivalents, and uses falling within the spirit and scope of the invention as expressed in the appended claims.

Before undertaking a detailed description of the sealing mechanism of the present invention, it may be helpful at this point to consider the features of the container which is being erected, filled and closed. In the description of this container, it will be assumed that the paperboard has a polyethylene coating thereon although again it should be understood that other thermoplastic coatings may find equal utility and application. For a more complete description of the container, reference should be made to the above-mentioned copending application, Serial No. 707,259, the disclosure in which is incorporated by reference herein.

Referring to FIG. 2 of the drawings, the container 50 there shown comprises a tubular body which is generally rectangular in cross section and provided at its base portion with a suitable bottom closure 51. The upper end of the body terminates in what will be recognized as the familiar gable topped end closure 52 surmounted by a central laminar rib or truss 53. In the particular container shown, the top end closure has incorporated therein an extensible pouring spout 54 for use in dispensing the contents of the container.

Such containers are conventionally formed from a blank of paperboard. By means of an appropriate pattern of score lines a blank (the inner face of which is illustrated in FIG. 3) is divided into a plurality of panels and areas which are utilized for the walls and the closure parts of the container. The body portion of the container is formed by four side panels 55 and a side seam flap 56 which is secured to the opposite side panel to form a side seam. Various rectangular and triangular panels 58–65 together comprise the foldable bottom portion indicated generally at 51 while another set of various rectangular and triangular panels 68–81 form the foldable top closure portion indicated generally at 52. The scorings in the blank dividing the various panels from one another as well as defining fold lines which are creased when the container is erected and the closure members are sealed are produced when the blank is cut from the initial polyethylene coated paperboard stock.

The bottom closure 51 is formed by a pair of outer flaps 61 and 65 secured to alternate ones of the side panels 55 and a plurality of triangular flaps 58–60, 62–64, secured to the other side panels. These triangular flaps are infolded when the bottom closure is formed and an appropriate tuck-in flap 84 on one of the outer flaps is inserted between the infolded triangular end panels and the opposite outer flap 65.

The top closure is designed to produce a gable topped configuration and to this end is formed with a pair of roof panels 68, 75, which are upwardly inclined in the completed closure, between which are located inner triangular panels 71, 78 each of which is surmounted by a pair of triangular fold back panels 70, 72 and 77, 79, respectively. One inner triangular panel 71 and its surmounting fold back panels 70, 72 later in the completed closure serve to define an extensible pouring spout 54. Each of the closure panels are surmounted by a rib panel 69, 73, 74, 76, 80 and 81, the outer rib panels 69 and 76 surmounting the roof panels 68 and 75 are in turn provided with upwardly extending sealing panels 85, 86. A flattened tubular blank 88 is formed by folding the blanks together and gluing the side seam, as shown in FIG. 4.

The improved container fabricating machine embodying the present invention, shown generally in FIG. 1, is designed and intended to receive at a magazine station flattened tubular blanks of the type shown in FIG. 3, to square out each blank at a squaring station until it is truly tubular in shape, as shown in FIG. 7, and thereafter to close one end, for instance the bottom, by a series of operations in a bottom closing station, which operation may be most clearly understood from an inspection of FIGS. 9 to 24. As thus completed with the bottom end closed, the container is discharged from the bottom forming mechanism and is passed to a sterilizing bath the function of which is to reduce and eliminate any bacteria which may have been formed on the container. Subsequently, the sterilized containers pass to a filling mechanism by which they are filled with the desired product. The filled containers then pass to a mechanism at a closing station which closes and seals the top closure of the container.

In accordince with the present invention, there is provided at the bottom closing station and at the top closing station heating means through which the closure elements are passed and which heats these elements to a temperature sufficient to melt the polyethylene coating on them. These heating means do not actually come into contact with the container elements, and thereby do not destroy or otherwise damage the integrity of the hot film. The temperature to which the closure elements are heated is high enough so that a sufficient amount of heat is retained to keep the polyethylene film molten or at least tacky during the subsequent closing operations. The heated flaps are then closed by engagement with suitable cold metallic closing means, and finally a pressure is exerted on the closed flaps to effect a complete seal of the closure elements and thereby of the container.

For the purpose of erecting the blank and forming the bottom closure one mechanism which has been employed is illustrated in Patent No. 2,357,535, issued September 5, 1954, to C. Z. Monroe. The mechanism embodying the present invention is quite similar to the mechanism shown in this patent although it includes certain improvements embodying the present invention for the purpose of closing and sealing the plastic coated paperboard container blanks. In the container erecting, filling and sealing machine shown in the aforementioned patent, and illustrated generally in FIG. 1, the steps in the process of producing a completed package, starting from a container blank, are briefly as follows. A blank having appropriate score lines is withdrawn from a magazine, squared out to a generally rectangular configuration and placed on a mandrel with the bottom closure portion extending outwardly from the end of a mandrel. The bottom closure is then completed. If the container is to be coated or otherwise treated, it is next passed through a treating station and then to a conveyor which carries the erected but open container through the filling and top closing stations.

Following this general procedure the plastic coated container for which the machine of the present invention is particularly adapted to erect and fill is supplied in the form of blanks to a magazine 90, mounted on the machine frame, from which blanks are withdrawn one at a time on top of the machine frame. For withdrawing a container blank from the magazine an appropriate nozzle mechanism 91 is provided. This nozzle mechanism, which is primarily of the character described in U.S. Patent No. 2,357,535 is made up of a plurality of nozzles 92 which project outwardly from a housing 94 to engage one panel 55 of the container blank. The nozzles 92 then retract to withdraw the container blank from the magazine 90 and the nozzle housing 94 rotates carrying the container with it. During this rotation the container blank is moved past a stop 95 (FIG. 8) and an erecting or squaring device 96 which act together to open the blank and square it to a generally rectangular position as shown in FIG. 7. To insure that the container blank remains open, it is given a reverse bend as the nozzle mechanism 91 carries the container past the squaring device 96. The squared out blank is next placed on a suitable rectangular mandrel 98 which carries it through the bottom closing steps. Prior to the placing of the open tubular container onto the mandrel 98, the blank is squared by inserting it between a pair of perpendicularly disposed squaring members 99 (FIG. 8). The nozzle housing 94 forms a third side of the squaring mechanism while a gate 100 swings downwardly on top of the container to complete the squaring operation.

The mechanism of which the mandrel 98 is a part comprises a wheel-like device having a plurality of mandrels 98 extending outwardly as spokes. When a container has been squared and with the mandrel in position for receiving it, a mechanism engages one end of the container and pushes it onto the mandrel. The wheel then rotates to carry this container through the various bottom closing stages.

The mandrel mechanism, as well as most of the other mechanisms of the packaging machine are operated in mechanical synchronism. To this end, the elements of the machine are operated from a main drive shaft 101 on which are located a plurality of take-off cams and gears. The nozzle and gate mechanism are driven by a suitable cam mechanism 102 including a plurality of cams 104 secured to an auxiliary shaft 105. This shaft is driven by an appropriate gear connection 106 with the main shaft 101.

In order to insert a container onto the mandrel 98 as well as to give a prebend to the score lines along which the bottom closure will be formed, there is provided a loading plate and paddle mechanism 108 (FIG. 8) which is mounted on a chain 109 supported on the machine frame beneath the container squaring arrangement. With a mandrel 98 in position, a loading plate 110 is carried forwardly by the chain so as to engage the edge of one of the bottom closure flaps 61. Upon continued movement of the loading plate 110 the container is pushed out of the squaring position and is guided onto the mandrel as shown in FIGS. 11, 11a, 11b, 11c and 11d. When the container reaches the bottom of the mandrel as determined by an appropriate stop 111, the loading plate 110 cams the bottom flap 61 of the container inwardly to begin the initial break in the score lines. At substantially the same time, the infolded triangular end panels of the bottom closure are pressed inwardly.

Because of the style of bottom closure employed in the container as described in more detail in the aforesaid copending application, it is desirable to impart a substantial prebending operation to the flaps defining it. To accomplish this, there is provided on the machine adjacent the mandrel position a pair of inwardly directed, pointed wings 114 shaped generally to the configuration of the bottom triangular infold panels 59, 63. These wings 114 are fixed to a pair of arms 115 pivotally mounted by means of a shaft 116 on a bridge 118 which is secured to the machine frame adjacent the mandrel loading position. These arms pivoted on the shaft 116 are in turn engaged by a link 119 coupling the arms to an actuating arm 120 on the piston 121 of an air motor 122. Axial movement of the piston draws on the links 119 which, acting in bell crank fashion, swing the wings 114 inwardly against the triangular infold panels 59, 63 of the container as shown somewhat schematically in FIG. 15.

For prebending the outer bottom panels 61, 65 at the same time the wings 114 are engaging the infold panels, there is provided a pair of angularly juxtaposed steeple plates 125 on the end of a paddle 126. The paddle 126 itself is secured to the chain 109 while the loading plate 110 is mounted thereon by means of a sliding rod 128 and a spring 129 fixed between a collar 130 on the rod 128 and a guide member forming a part of the paddle and supporting the loading plate rod 128. When the container engages the stop 111 on the mandrel, the loading plate 110 cams the flap 61 inwardly and rides beneath it. The spring and rod mounting enables the loading plate to move relatively to the steeple plates and paddle when the container movement stops.

The combined operation of the loading plate 110, steeple plates 125, and wings 114 serves to prebend the score lines of the bottom closure an amount sufficient to enable them later to be closed and sealed. The prebending operation sequence is shown in FIGS. 11a, 11b, 11c, 11d and 14–16, and results in bottom closure flaps which are easily closed by an appropriate mechanism.

More specifically, the prebending operation sequence starts when the trailing edge of the container bottom closure flap 61 is engaged by the loading plate 110 as shown in FIG. 11a. When the container hits the stop 111 on the mandrel 98 (which engages the flaps 80, 81) continued movement of the loading plate cams flap 61 inwardly as shown in FIG. 11b to start the prebending operation. The loading plate continues to drive, forcing the flaps 61 inwardly as shown in FIG. 11c. At the same time, the wings 114 swing inwardly against the triangular infold panels 59, 63 as shown in FIGS. 11c and 15. Further movement of the plate 110 is resisted by the container thereby compressing the spring 129. This enables the steeple plates 126 to engage bottom closure flaps 61 and 65 as shown in FIG. 11d thereby to complete the prebending operation.

Upon completion of the prebending operation, the wing air motor 122 reverses to push the links 119 which thereby swing the wings 114 out of the bottom closure and, at substantially the same time, the paddle 126 and loading plate 110 are withdrawn. The mandrel carrying the container with the bottom closure projecting outwardly then indexes to a position where the polyethylene coating on the closure flaps is subjected to a sufficient amount of heat to cause it to melt.

In accordance with one aspect of the present invention, means are provided for heating the bottom closure end of the container to a sufficient temperature to fuse the polyethylene thereon and yet preserve the integrity of the polyethylene film so that it can function as an adhesive in forming the end closure. This is accomplished by a heating unit 133 defining a tunnel 134 through which the projecting bottom closure flap members of the containers pass as the mandrels 98 on which they are carried rotate. The surfaces of the bottom closure flaps are not contacted by the heaters but rather the heat within the tunnel 134 is sufficient to fuse the polyethylene on both sides of the flat paperboard surfaces while maintaining the integrity of the film. It will be appreciated that the temperature level and thus the heat content of the paperboard container should be sufficiently high so that the paperboard will retain its heat over the period of time required to close and seal the bottom flaps.

One illustrative heating tunnel is shown in FIGS. 17 and 18 and comprises a plurality of generally U-shaped heating elements 135 the ends of which are secured to spaced bus bars 136 supported on a housing 138. The heating elements 135 which may comprise, for example, a continuous coil of wire wound on a ceramic core and surrounded with a nickel steel sheath, one commercial form of which is sold under the trademark "Chromolox" by the Edward Weigand Company, are electrically secured to the bus bars and are axially alined one with the other so as to define a curved tunnel having a radius of curvature substantially equal to the radius of rotation of the container flaps to be heated. In the heating tunnel described, the surface temperature of the heaters is about 1600° F., and it has been noted that at a distance of about ½ inch from the heaters, the temperature is 1300° F. The tunnel is dimensioned to provide a clearance of between ¼ inch and ½ inch from the surfaces of the container flaps. With this construction, and with a dwell time of about .9 second and a total heat exposure time of about 1 second it has been found that the surface temperature of the flaps is raised to somewhat in excess of 300° F. As pointed out in the copending application describing the plastic coated containers, the temperature of the polyethylene coating must be raised to about 300° F. in order to fuse the coating and heat the paper sufficiently so that the flaps retain enough heat for the subsequent pressure sealing operation. The overall lapsed time after heating before the flaps are folded and pressure is applied to seal them together is about 1½ seconds.

For directing the heat radiated by the heating elements 135 onto the container flaps, the elements 135 are surrounded by a reflector 139. This reflector is generally arcuate in shape so that it conforms to the alinement of the heating elements. To support the reflector 139 within the housing 138 a plurality of rods and spacer elements 140 are provided mounted between the longitudinal vertical walls of the housing and reflector.

Heat losses from the heating unit are kept to a minimum by lining the inner surfaces of the housing 138 and the outer surfaces of the reflector with a suitable insulator medium such as a refractory sheet material.

In order to reduce or eliminate warm up time in the event it is necessary to shut down the machine temporarily, it is desirable that the heater remain hot. Under such circumstances, however, should a container be on a mandrel within the tunnel when the machine motion stops, the extreme temperatures within the tunnel will ignite the paper of the container. For this reason, provision is made for removing the heater tunnel from its position over the container and mandrel to an out of the way position. At the same time, to avoid excessively heating the adjacent areas of the machine, it is desirable to isolate the tunnel from the adjacent exposed metal parts of the packaging machine so as to block the radiation of heat from the heating elements. To this end the tunnel means are provided for removing the heating unit from its position above the mandrel to a retracted position above an insulating reflector plate 142 secured to the machine frame. The illustrative means shown in the drawings for this purpose comprises a bridge 144 which is guidably mounted on a pair of spaced rods 145 and which supports the heating unit 133 secured to the machine. The rods 145 are mounted, by means of spacer brackets 146, onto a support 148 secured to the sides of the machine at each side of the mandrel positions. The bridge 144 is formed with a pair of grooves 149 having appropriate bushings 150 therein for slidably receiving the guide rods 145.

For purposes of sliding the heating tunnel 133 back and forth on the guide rods 145, there is provided an air cylinder motor 151, the piston 152 of which is secured to the bridge and the cylinder 153 of which is mounted on a cylinder support bracket 154 secured to the machine. The piston end is secured to a depending bracket 155 on the bridge clevis by means of a clevis pin 156. A similar construction 158 is employed mounting the cylinder 153 to the cylinder support bracket 154 on the frame.

The air cylinder motor 151 is controlled by an appropriate valve 160 which is actuated whenever the motion of the mechanism stops, as will be described in further detail below. With this safety feature, whenever the machine stops, with the attendant danger that the mandrel and container will be positioned within the heating tunnel, the tunnel motor 151 is immediately energized to slide the tunnel to its inactive position over the insulating plate 142. The heating elements remain hot until deliberately turned off by the machine operator, and are thus ready for immediate use without the delay involved in a warm up period. The heating elements 135 are operated at close to 100% of their capacity, and their temperature is controlled by a suitable controller which, once the maximum temperature is reached, cycles in an on-off manner to maintain the temperature of the heaters at the desired level.

After the polyethylene coating on the bottom closure flaps has been activated and raised to its fusion point, the mandrels index the container out of the heating tunnel and into a position where means are provided for engaging the closure flaps and folding them together as a bottom closure. The flap arrangement, as described in detail in the above mentioned copending application relating to the plastic coated container, and to FIG. 7, is such that the flaps can be folded together by bending the triangular infold panels 59, 63 inwardly with the bottom flap panels 61, 65 outermost. As these flaps are folded together, the tuck-in flap 84 on one edge of a bottom flap 61 is inserted beneath the cut edge of the other bottom flap 65.

One illustrative means for folding and tucking the flaps comprises a tucking finger 162 having a pair of sloping faces 163, 164, of which 163 engages the bottom flap 61 having the tuck-in flap 84 thereon and the other of which 164 engages the outer bottom flap 65. To provide the necessary tucking action, the tucking finger is provided with a slot 165 for receiving the cut edge of the outer bottom flap 65 and thereby holding it spaced from the tuck-in flap 84. These surfaces are smooth and, being relatively cool, as compared to the temperature of the container flaps, enable the fused polyethylene to slide thereacross during the folding and tucking operation. Because a sufficient amount of heat is retained between the paperboard container and the polyethylene to maintain the latter tacky even upon contact with the cold tucking finger 162, the sealing propensities of the polyethylene are not destroyed.

For accomplishing the folding and tucking operation when the mandrel has indexed the container with the heated flaps to folding position, means are provided for moving the tucking finger 162 into folding engagement with the container flaps. One illustrative means is shown in FIGS. 19–24 of the drawings and comprises a mechanism operatively associated between the tucking finger 162 and a cam 166 on the end of the main cam shaft 101 of the machine. Beginning at the cam end of the mechanism (FIG. 21), it can be seen that it comprises a cam follower wheel 168 engageable with the cam 166 and secured to the end of a vertical rack 169. The end of the rack is bifurcated and between the ends thus defined there is mounted the cam follower wheel 168. The rack itself is mounted above the cam 166 for vertical reciprocation within appropriate bushings 170 in a rack support 171 secured to the machine frame. For biasing the rack downwardly against the cam 166 there is provided a spring 172 acting between a shoulder 174 on the rack support and a collar 175 mounted on the rack itself. At its upper end the rack 169 is provided with a plurality of teeth 176 (FIG. 23) engageable with a pinion gear 178 supported in a housing 179 at one end of a bridge 180 mounted between the two sides of the packaging machine and extending generally parallel to the axis of the mandrel wheel. To facilitate entry into the region of engagement between the rack and the pinion, an appropriate cover 181 is applied to the end of the housing.

The pinion gear 178 engaged with the vertical rack 169 is fixed at one end of a shaft 184 extending through the housing and journaled in appropriate bushings 185 mounted therein. At the opposite end of the shaft 184 there is provided a second pinion gear 186 which in turn engages an inclined rack 188 having secured at its operative end the tucking finger plate device 162. The second gear 186 and rack 188 are enclosed in a housing 189 mounted on the bridge 180 and provided with an access cover 190. The inclined rack 188 is guided in appropriate bushings 191 mounted in the housing, and its movement is limited between points defined by a dog 192 which projects into a slot 194 in the inclined tucking finger rack (FIG. 20). Through the aforesaid mechanism, as the cam 166 on the main cam shaft 101 of the machine rotates, the tucking finger 162 moves in and out in synchronism with the machine mechanism.

When the tucking finger has folded the flaps as shown in FIGS. 19 and 20, the tucking action is completed by the indexing of the mandrel 98. This motion moves the container and its partially folded flaps away from the tucking finger and causes the outer bottom flap 65 to ride over a cam surface 196 on a mounting block or arm 198 pivotally secured to a block 199 fixed to the tucking finger rack housing 189. As the container moves off of the tucking finger, it can be seen that the tuck-in flap 84 is nested below the outer flap 65 of the bottom closure (FIG. 20).

As the mandrel continues to index, the container flaps are held together by means of a pair of guide rails 200 secured to the cam surface arm 198 and formed with a radius equal to that of the radius of rotation of the mandrel. The rails hold the flaps together until the mandrel positions the container in front of an appropriate pressure pad which applies a sealing force to the flaps. As pointed out above, the tucking and indexing operation to position the tucked and folded bottom closure flaps in front of the pressure pad occupies a time of about 1½ seconds.

For servicing purposes to facilitate access to containers when the mandrel stops in front of the rails 200, the latter are adapted to be swung away from their position in front of the mandrel. This is accomplished by the provision of means 201 for releasably locking the rails to the machine. One illustrative locking means comprises a leg 202 secured to the lower end of the track and having thereon a locking post 204 with a hand knob 205 at one end and a locking foot 206 at the other engageable with an appropriate locking tab 208 secured to the machine. By pushing the locking post downwardly against the force of a spring 209 and rotating the knob, the locking foot 206 engages in a corresponding recess in the tab 208.

For applying a sealing pressure to the containers there are provided two sets of pressure pads 209, 210 which can be applied simultaneously upon the bottom of two separate containers at different mandrel positions. With such an arrangement a sealing force is applied to the bottom closure of a single container at two successive positions (FIG. 10). These pressure pads are constructed and operate substantially as described in U.S. Patent No. 2,357,535. Briefly, each of the pressure pads being a generally rectangular metallic block which may, if desired, be recessed to receive appropriate cooling coils, is connected to the bottom flange 212 of a cylindrical sleeve-like member 214 supported for movement in a cylindrical guide 215 which is carried by a cross bridging member 216 the ends of which are rigidly connected to the side frame members of the machine. Within the sleeve-like member 214 is positioned a plunger 218 provided with several teeth 219 on one side intermediate its ends meshing with a horizontally supported rotatable shaft 220, journaled in the bridging member 216. Rotation of the shaft 220 about its axis will either raise or lower the plunger 218. When the plunger is raised it carries with it the sleeve 214, the upper end of this sleeve being closed by a plug 221 against which the plunger bears. When the plunger 218 is lowered it moves the pressure pad downwardly into contact with the container flaps which have been folded across the end of the mandrel directly below it. Thereafter, movement of the pad is interrupted but rotation of the shaft is continued to compress a spring 222 thereby forcing the pad against the coated paper end flaps with the desired degree of pressure. Upon the outer end of the shaft 220 there is fixed a lever arm 224 the end of which is connected by means of a link 225 to a member 226 fixed upon the shaft 97 of the mandrel unit for rotation therewith.

For actuating the pressure pads, there is fixed to the main cam shaft a pressure pad actuating cam 229 with a cam track 230 on which there rolls a cam follower (not shown) which is operatively connected to the shaft 97. As the main cam shaft revolves the shaft 97 will be intermittently oscillated so that the two pressure pads 209, 210 will move radially inwardly and be subsequently withdrawn in synchronism with the movement of the mandrels 98. In this manner, and with two pressure pad units being employed a sealing pressure will be applied at two successive positions to the heated and folded bottom end closure flaps of the container. Additionally, the cooling action of the pressure pads serves to solidify the fused plastic and, with the pressure which is applied at the same time, the plastic coatings will seal together the opposed flaps to produce a highly effective liquidtight seal at the bottom of the container.

Upon further indexing of the mandrels carrying the containers with the now sealed bottom flaps, the containers are positioned in front of a series of baskets 232 for carrying the containers through a sterilizing medium. The containers are removed from the mandrels and placed in the baskets, as described in the aforesaid patent, by means of compressed air which serves to blow the containers off the mandrel into the basket. This is accomplished by appropriate means supplying compressed air into the mandrels at the container discharge position. The compressed air escapes through holes in the end of the mandrel and, because the container is sealed, creates a pressure within it which serves to blow the container into the basket. The series of baskets 232 shown schematically in FIG. 10 are carried on a chain and pass through a bath of water 234 maintained at approximately 200° F. The water is heated by an appropriate steam source much like that used previously for heating the paraffin with which the containers were coated as described in Patent No. 2,357,535. It has been found that the near boiling water bath is highly effective for killing any bacteria which may have been formed on the containers during the erecting and sealing operations.

From the boiling water bath, the containers are positioned in any suitable manner in a conveyor chain 235 with the open top end of the containers in an uppermost position so that the containers may subsequently be filled and sealed.

The conveyor for advancing the containers includes container body gripping fingers 236 which engage the front and rear side wall panels of the container and hold the container tightly as it proceeds in a step-by-step manner through the filling and closing mechanisms. The conveyor is of the intermittently acting type so that the containers move forwardly with a step-by-step motion halting only briefly between movements to give the filling and closing mechanisms an opportunity to perform their stated functions while the container is stationary.

As described above, the top closure end of each container comprises a plurality of panels 68—81 defined by score lines which define boundaries of the interconnected panels. Included among the panels are a pair of outer roof panels 68, 75 and inner triangular panels 71, 78. It has been found to be advantageous to effect a preliminary top closing operation just prior to the introduction of the charge of liquid which the container is to retain. The primary purpose of this preliminary top closing is to break the score lines and facilitate the completion of the closure after the container is filled. One illustrative mechanism for carrying out such a preliminary top closing action is shown in U.S. Patent No. 2,410,587 to C. Z. Monroe. The disclosure of this patent is incorporated by reference herein, but for the present purposes a brief description of this mechanism will be given. Essentially, the preliminary closing mechanism comprises a mandrel 238 which is insertable into the container body during the folding or closing and so positioned therein as to insure that the closure is made along the score lines. Operatively associated with the mandrel are a pair of opposed generally triangular folding fingers 239, 240 which engage the triangular infold panels 71, 78 of the container closure. To effect a partial closing, the mandrel 238 is lowered into the open mouth of the container and the triangular fingers 239, 240 swing downwardly and inwardly against the mandrel to give a preliminary bend to the score lines defining the triangular top closure panels. The mandrel and fingers are mounted for vertical movement on an appropriate support 241 and are actuated by any suitable means including a cam secured to the main cam shaft of the machine so that the partial closing mechanism is operated in synchronism with the remainder of the machine and with the movement of the conveyor.

In order to insure that the score lines defining the top closure are fully broken or bent, means are provided for completing the closure but without sealing the flaps together. One illustrative means for accomplishing this purpose comprises a set of outwardly and downwardly inclined steeple plates 243, 244 supported on the bracket mounting the mandrel and finger mechanism and which extend over the conveyor to provide a second preclosing operation on each container. This second preclosing operation serves particularly to insure that the score lines defining the upstanding rib panels are given a prebend, thereby avoiding difficulty in later closing the filled container.

From the preclosing mechanism, the open containers are carried by the conveyor to a filling mechanism of any conventional type and indicated generally at 246 (FIG. 1). Such mechanism operates to fill a predetermined charge of milk or other product into the open topped containers. Associated with this filling mechanism may be appropriate auxiliary devices such as defoamers and the like. Again, the containers are carried by the conveyor through the filling mechanism in a step-by-step manner, and the filling mechanism operates in synchronism with the conveyor.

It will be appreciated from the above description of the container that the top closure flaps thereof are coated on both sides with a thermoplastic material such as polyethylene. Accordingly, in accordance with another aspect of the present invention, means are provided for heating the surfaces of the top closure ribs and for pressing these heated surfaces together to effect a seal of the container closure. As described in connection with the bottom sealing mechanism, it is necessary to heat the closure flaps to a sufficiently high temperature to insure that the polyethylene is fused without destroying its integrity as a film and to further insure that the closure elements remain hot enough for a sufficient length of time to permit the flaps to be closed and pressed together. Accordingly, an appropriate mechanism is provided for heating the inner surfaces of the upstanding ribs on the closure panels and subsequently for closing the panels so that the heated rib portions are in juxtaposed relation and finally for applying a sealing force to sealingly press the closure ribs together and thereby form a liquidtight top seal on the container.

One illustrative mechanism for heating the ribs of the top closure is shown in FIGS. 27–30 and comprises a heating tunnel 248 having three longitudinally extending heating elements 249, 250, 251 mounted therein and positioned above the conveyor so that as the container is carried therealong the outer sealing flaps 85, 86 extend upwardly between the tunnel walls and with the heating elements extending between them. In this manner the rib panels 69, 73, 74, 76, 80, 81 pass directly below the heating elements and the heat is directed primarily onto the inner surfaces of the rib panels.

The tunnel itself comprises an elongated sheet metal channel or reflector 252 supported by a pair of yokes 254 on a base member 255. The yokes 254 are mounted on the base member 255 in a manner enabling it to be tilted relative thereto. To this end, the base member is provided at a point adjacent each yoke with a pair of spaced apertures 256 through which extend bolts 258 threadably engaged with the yoke 254. Intermediate the bolts is a pin 259 fixed to the base 255 and abutting the upper surface of the yoke 254. By adjusting the threaded engagement of the bolts with the yoke 254 the latter can be tilted relative to the base 255. Extending between the depending legs of the yoke and through the tunnel housing is a rod 260 which serves to support both the tunnel reflector 252 and the heating elements 249–251. For the latter purpose, the rod 260 is provided with a plurality of spacers 261 while each heating element is formed attached at intervals to a generally U-shaped bracket member 262 through which the rods 260 extend. The rods are supported in appropriate apertures 264 in the yokes and are prevented from sticking out of the apertures by caps 265 threadably engaged in the yoke. The heating elements themselves may be of the type described above. Each of these heating elements is connected to an appropriate power source and control so that their temperature may be regulated, the power source and control being of any suitable type known in the art.

Means are provided for movably mounting the tunnel on the mechanism so that it may be located over the conveyor or, in the event it is necessary to stop the movement of the conveyor, may be withdrawn to an out of the way position where it can remain energized without heating the adjacent metal parts of the packaging machine. One illustrative mounting means is shown in FIG. 27 and comprises a bridge member 266 to which the heater unit is attached by a pair of spaced arms 268. The bridge member 266 is guidably mounted for traversing movement on a pair of spaced rods 269 mounted on a frame member 270 secured to the main frame of the machine and at an inclined position relative to the conveyor. Suitable bearings 271 are provided in the bridge 266 for slidable engagement with the rods 269. The bridge 266 and the heating tunnel 248 carried thereby is traversed along the rods 269 by means of an air motor 272 which may be of the piston and cylinder type. The cylinder 274 of the air motor is mounted on the frame member 270, and the free end of the piston 275 is secured to the bridge 266.

For reflecting radiated heat and for protecting the other metallic machine elements from heat radiated by the heating elements in the tunnel, there is provided on the forward end of the frame support a reflector or guard 278 having an upturned longitudinal edge 279 adjacent a depending leg of the tunnel. This reflector is positioned at one side of the conveyor so that when the tunnel is retracted by the air motor it is positioned above the reflector and thus shielded from the conveyor and packaging machine structure. The inclined position of the rods guide the heating tunnel both laterally away from the containers on the conveyor and upwardly so that the edge of the tunnel reflector does not come into contact with the upstanding container flap when the tunnel is moved. The slight lifting of the tunnel also serves to reduce the heating of the machine parts when the tunnel is over the reflector 278.

Once the inner surfaces of the container ribs have been heated to a sufficiently high temperature to fuse the polyethylene thereon, the containers pass through a closure mechanism which engages the outer surfaces of the container ribs and roof panels and urges them together to a closed position. This closing operation is facilitated, as pointed out above, by the preliminary closing carried out before the container is filled.

For the purposes of closing the ribs and pressing them together, there is provided a pair of spaced closing rails 281, 282 which are generally triangular in shape and are positioned to define a converging slot 283 located above and parallel to the conveyor. These rails are alined above the conveyor and converge in the direction of movement thereof so that the upstanding ribs and sealing flaps of the containers pass between them and are thereby urged together. When the containers have passed between the closing rails 281, 282 as shown in FIG. 31 they are engaged by a pressure or sealing mechanism which applies a pressure to the upstanding ribs and sealing flaps of the container for the purpose of sealing them together. The polyethylene coating on the inner surface of the ribs, being tacky from passing through the heating tunnel, adheres to the polyethylene surface on the opposite rib and forms a polyethylene-to-polyethylene bond. The seal thus formed is exceptionally strong and is liquid tight. One illustrative pressure sealing mechanism is shown in U.S. Patent No. 2,212,449 and is capable of applying a sufficiently heavy pressure so that the various plies or panels comprising the closure rib are closely pressed together and the fused polyethylene is caused to flow and occupy the spaces and crevices intermediate the several panels which might otherwise serve as ducts or passages for the escape of liquid.

The pressure sealing mechanism shown in FIGS. 31 and 32 comprises a bridging member 284 the ends of which are supported on the side frame members of the machine. Supported on the bridging member are a pair of spaced container rib engaging jaws 285, 286, one of which, 285, is stationary and the other of which, 286, is movable. Both jaws are provided with opposed rib engaging surfaces 287, 288, respectively. The stationary one of these jaws, 285 (shown on the left in FIG. 32), is integral with and forms a continuation of the adjacent closing rail 281. The opposite closing rail is formed with a cut away portion for receiving the movable jaw 286. The stationary jaw 285 which forms a continuation of the closing rail 281 is supported on the frame by a manually operable locking device comprising a vertically extending rod 289 slidably retained within a bushing 290 mounted in a cylindrical aperture 291 formed in the frame 284 and threaded at its lower end in the jaw 285, and having on its upper end a pair of nuts 292 and a washer 293 engaging the frame. While the mass of cold metal defining the jaws is usually sufficient to cool the hot container flaps, suitable cooling coils may be provided in the stationary jaw if desired.

The movable jaw 286 is secured to the forward end of a slide 295 by an appropriate means such as screws or the like and is formed with a tongue 296 fitting closely within a corresponding slot formed in the forward edge of the slide. The slide member 295 is in the form of a flat plate which is retained within a horizontally extending slideway 298 defined by the frame 284.

The slide 295 is longitudinally slotted, the slot being shown at 299, for receiving the flattened lower end of a stud 300 secured within a suitable recess in the frame 284. Housed within the slot 299 and having one end bearing against the end of the slot and the other end against the stud is a coiled compression spring 301 which acts to project the slide to its inoperative position, that is, to the right as shown in FIG. 32. The end of the slide remote from the jaws in provided with a threaded aperture 302 for threadably receiving a headed bolt 304.

For operating the slide there is provided a vertically extending lever 305 having at approximately its mid point a roller 306 engaging the head of the bolt 304. At its upper end the lever 305, which is preferably of the bifurcated type, is pivotally connected to an enlarged intermediate portion of a rod member 308, one end of which is slidably retained within a horizontally extending cylindrical aperture 309 defined in the frame, and the other end of which is slidably retained with an axial cylindrical aperture 310 formed in a plug or bushing 311. The plug is in turn received within a corresponding aperture 312 in the frame 284 and has threaded engagement therewith for axial adjustment. The rod is formed with a pair of shoulders 314, 315 on opposite sides of the enlargement to which the lever is pivoted. One of the shoulders 314 engages a corresponding shoulder 316 on the frame 284 while the other shoulder 315 receives a spring 318 surrounding the rod and acting between the shoulder 315 and the end of the bushing 311.

At its lower end, the lever 305 is provided with a roller 320 which bears against the periphery of the cam 321 fixed upon the main cam shaft 101. The cam is shaped so that the slide 295 is given a preliminary rapid movement toward a container rib which is positioned to be acted upon, followed by a relatively slow final movement as the face 288 of the movable jaw 286 comes into contact with the container rib so that the rib is subjected to a heavy pressure during a short travel of the jaw. This heavy pressure occurs as a result of the helical coil spring 318 acting against the rod member 308 at the upper end of the lever 305. For a more detailed description of this pressure mechanism, reference should be made to the aforementioned Patent No. 2,212,449.

To insure that the container is tightly sealed it is engaged by the pressure pads at two dwell positions, that is, the container ribs are pressed together and when the container indexes one step forward the ribs are again pressed together. From this final sealing step the containers are discharged to an appropriate loading conveyor mechanism or loading table.

If desired one or both of the pressure pads at the bottom and top closure stations may be coated with a layer of a tetrafluoroethylene containing coating material in order to reduce the possibility of their sticking to the hot polyethylene coating on the closure flaps. Because the pressure pads are not heated, however, it has been found that the cold metal does not stick to the polyethylene. With the provision of means for retracting the heating tunnels to an out of the way position above the reflectors, the metal parts of the mechanism which come into contact with the heated polyethylene coated container surfaces remain sufficiently cool so that they do not stick to the polyethylene.

Any suitable control circuit may be employed for the foregoing machine. It is desirable that this control circuit include appropriate means for withdrawing the heating tunnels when the machine mechanism stops and for insuring that the heating tunnels are not positioned above the sealing positions until the machine is ready for operation. One method of accomplishing this is by an appropriate switch (not shown) connected as an overload switch on the machine clutch. In the event the machine jams, the overload switch operates causing the tunnels to be retracted from their positions for heating the container flaps and positioned above the reflector plates. The positioning motors for the heating tunnels are normally operative to hold the tunnels over the protective reflectors, and a safety switch (not shown) prevents the actuation of the motors to place the tunnels in operative position when, for example, the sealing temperature is not reached or the sterilizing bath water is not hot.

By way of summary it may be helpful at this point to review the steps of the squaring of the blank, completion of the bottom closure, filling, and sealing of the top closure in the process of producing a completed package. This sequence of steps is shown in FIG. 32. In this FIG. 32, the container blank in various stages of erection will be referred to as 50a, 50b etc. Briefly, container blanks are withdrawn from a magazine 90 by an appropriate loading mechanism 91 (FIG. 8) and the blanks are squared to a rectangular cross section 50a. The squared blanks are placed upon a rectangular mandrel 98 and, at substantially the same time, the bottom closure flaps are subjected to an initial creasing or preclosing operation to produce a blank 50b with partially folded bottom flaps. After receiving a squared container blank, the mandrel rotates to carry the container, with its bottom closure flaps projecting outwardly from the end of the mandrel 98, through a heating tunnel 134 where the polyethylene coating on the closure flap surfaces of the container 50c is raised to a temperature sufficiently high to cause it to melt. The heated bottom closure flaps are then folded together and the tuck-in flap inserted into position beneath the outer bottom flap by an appropriate tucking finger 162 as shown at 50d. Following the tucking operation, a sealing pressure is applied to the closed and heated bottom flaps by suitable pressure pads 209, 210 to cause the polyethylene on adjoining flaps to adhere together and seal any crevices formed between the flaps thereby to provide a liquid-tight seal, as shown at 50e. The erected container 50f, having a closed bottom end 51 is placed into a basket 232 which is then immersed into a bath 234 of near-boiling water. The water bath sterilizes the containers which are then placed open end up on a conveyor 235 which carries them through a filling and sealing mechanism.

Prior to being filled, the top closure of the containers is folded to its closed position. This is accomplished by a mandrel 238 (FIGS. 25 and 26) which is inserted within the mouth of the container and by a pair of triangular fingers 239, 240 which engage the triangular infold panels 71, 73 of the top closure 52. Subsequent to this initial closing, the containers are subjected to a second preclosing operation by engagement therewith of a pair of steeple plates 243, 244 which serve to urge the closure flaps to their completely closed position.

Following the preclosing operation, the container 50g is filled with the desired product such as milk. The filled container is carried by the conveyor through a second heating tunnel 248 wherein the polyethylene coating on the inner surfaces of the upstanding top closure flaps is raised to a sufficiently high temperature to cause it to melt as shown at 50h. The heated closure flaps are then passed between a pair of converging rails 281, 282 which close the top flaps by bringing the upstanding rib panels together, as shown at 50i. The closed upstanding panels are engaged by the jaws 285, 286 of a pressure closing mechanism, and the polyethylene, being in a fused or relatively molten state acts as a pressure sensitive adhesive which effectively seals the top closure 52 of the container. The finished, filled container is shown at 50j and in FIG 2.

In the event something occurs which necessitates stopping the machine, the heating tunnels 134, 248 automatically retract to an out of the way position over insulated reflector plates 142, 278 respectively. In this manner, while the tunnels remain hot, they do not heat the adjoining metal parts of the machine. Any suitable control may be provided for positioning the heating tunnels above their respective plates when the machine stops.

We claim as our invention:
1. In a packaging machine for erecting and closing the closure elements of containers having a coating of a thermoplastic material on the surfaces thereof, the combination comprising, means for preliminarily closing the closure elements of the container, means for heating said thermoplastic coating on the sealing surfaces of the closure elements, means for closing the closure elements to bring said heated surfaces into surface-to-surface con- tact, and means for applying a sealing pressure to said closure surfaces, said heating means comprising a plurality of parallelly alined heating elements defining a heating tunnel, a reflector mounting said elements, an insulating material lining said reflector for reducing the heat loss therefrom, a support mounting said reflector and heating elements and supported on the packaging machine for movement relative to the closing mechanism thereon, and heat resistant means on the machine remote from the containers over which said heating means is positioned by said mounting means when said heating means is to be held inactive.

2. In a packaging machine for erecting and closing gable top closure elements including sealing flaps of containers having a coating of a thermoplastic material on the surfaces thereof, the combination comprising, means for preliminarily closing the closure elements of the container, means for heating said thermoplastic coating on the sealing surfaces of the closure sealing flaps, means including a pair of converging rails for closing the flaps to bring said heated flap surfaces into surface-to-surface contact, and means for applying a sealing pressure to said flaps, said heating means comprising a plurality of parallelly alined longitudinally extending heating elements for heating the inner surfaces of said flaps, a reflector mounting said elements and defining therewith a heating tunnel, an insulating material lining said reflector for reducing the heat loss therefrom, a support mounting said reflector and heating elements and supported on the packaging machine for movement relative to the closing mechanism thereon, and heat resistant means on the machine remote from the containers over which said heating means is positioned by said mounting means when said heating means is to be held inactive.

3. In a packaging machine for erecting and closing the closure elements of containers having a coating of a thermoplastic material on the surfaces thereof, the combination comprising, means for preliminarily primarily closing the closure elements of the container, means for heating said thermoplastic coating on the sealing surfaces of the closure elements, means for closing the closure elements to bring said heated surfaces into surface-to-surface contact and means for applying a sealing pressure to said closure surfaces, said heating means comprising a plurality of parallelly alined substantially U-shaped heating elements defining a heating tunnel, a reflector mounting said elements, an insulating material lining said reflector for reducing the heat loss therefrom, a support mounting said reflector and heating elements and supported on the packaging machine for movement relative to the closing mechanism thereon and heat resistant means on the machine remote from the containers over which said heating means is positioned by said mounting means when said heating means is to be held inactive.

4. A heating mechanism for use on a packaging machine for sealing container closures having a thermoplastic coating thereon, said mechanism comprising, in combination, a base supported on the packaging machine frame, a slide guidably mounted on said support, means for translating said slide relative to said support, a heating tunnel mounted on said slide, a plurality of heating elements fixed within said tunnel, a refractory insulating and reflecting plate mounted on said frame, and means for energizing said translating means to remove said tunnel from over said insulating plate to position the same in juxtaposition with container closures to be heated.

5. In a packaging machine of the character described for use with paperboard containers having a thermoplastic coating medium thereon, the combination comprising conveyor means for carrying containers through said machine, heating means adjacent said conveyor means for softening the thermoplastic coating on the sealing surfaces of each container carried by said conveyor means, means for thereafter bringing said heated surfaces of the container into surface-to-surface contact and applying a sealing pressure thereto, means for retracting said heating means from juxtaposed position adjacent the container conveyor means, and heat insulating reflector means for isolating said heating means from the conveyor means when said retracting means retracts said heating means from its position adjacent the conveyor means.

References Cited in the file of this patent
UNITED STATES PATENTS

| | | |
|---|---|---|
| 1,222,746 | Doyle | Apr. 17, 1917 |
| 1,338,071 | Cohen | Apr. 27, 1920 |
| 2,085,477 | Scott | June 29, 1937 |
| 2,156,037 | Wollenweber | Apr. 25, 1939 |
| 2,497,212 | Donofrio | Feb. 14, 1950 |
| 2,798,349 | Mojonnier | July 9, 1957 |